(12) United States Patent
Ota et al.

(10) Patent No.: US 8,176,025 B2
(45) Date of Patent: May 8, 2012

(54) INFORMATION PROCESSING APPARATUS FOR STORING DOCUMENTS WITH PARTIAL IMAGES

(75) Inventors: Hiroshi Ota, Saitama (JP); Seiji Takahashi, Tokyo (JP); Masaki Tasaka, Tokyo (JP); Yuichiro Sakuta, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 455 days.

(21) Appl. No.: 12/401,663

(22) Filed: Mar. 11, 2009

(65) Prior Publication Data

US 2009/0234882 A1   Sep. 17, 2009

(30) Foreign Application Priority Data

Mar. 17, 2008   (JP) ................................. 2008-068173

(51) Int. Cl.
*G06F 7/00* (2006.01)

(52) U.S. Cl. ......... 707/705; 707/602; 715/273; 715/255

(58) Field of Classification Search .................... 707/705
See application file for complete search history.

(56) References Cited

U.S. PATENT DOCUMENTS

| 6,169,998 | B1 | 1/2001 | Iwasaki et al. |
| 2007/0216712 | A1* | 9/2007 | Louch ........................... 345/660 |
| 2008/0162603 | A1* | 7/2008 | Garg et al. .................... 707/204 |

FOREIGN PATENT DOCUMENTS

| EP | 0 483 039 A | 4/1992 |
| EP | 1 347 397 A | 9/2003 |
| JP | 11-025113 | 1/1999 |
| WO | WO 01/22299 A | 3/2001 |

OTHER PUBLICATIONS

Extended European Search Report.

* cited by examiner

*Primary Examiner* — Fazlul Quader
(74) *Attorney, Agent, or Firm* — IPUSA, PLLC

(57) ABSTRACT

An information processing apparatus includes a partial image extracting unit configured to extract partial images from input documents, a meta information setting unit configured to associate a given one of the input documents with the partial images of the given one of the input documents to generate meta information indicative of the association regarding the given one of the input documents, and a search unit configured to search for and retrieve one of the input documents as a first document from the document storage unit to display the first document on a display unit, wherein the meta information setting unit adds copy-source information indicative of the partial image of the first document to the meta information regarding a second document of the input documents when the partial image of the first document is copied and pasted onto the second document.

20 Claims, 31 Drawing Sheets

FIG.6A

PARTIAL IMAGE A-1-2 OF DOCUMENT A

| | DOCUMENT | PAGE | PARTIAL IMAGE |
|---|---|---|---|
| SELF-DESCRIPTIVE INFORMATION | A | A-1 | A-1-2 |
| COPY-SOURCE INFORMATION | – | – | – |
| COPY-DESTINATION INFORMATION | – | – | – |

PARTIAL IMAGE A-1-2 OF DOCUMENT A

|  | DOCUMENT | PAGE | PARTIAL IMAGE |
|---|---|---|---|
| SELF-DESCRIPTIVE INFORMATION | A | A-1 | A-1-2 |
| COPY-SOURCE INFORMATION | - | - | - |
| COPY-DESTINATION INFORMATION | B | B-2 | B-2-4 |
| COPY-DESTINATION INFORMATION | C | C-4 | C-4-8 |

PARTIAL IMAGE B-2-4 OF DOCUMENT B

|  | DOCUMENT | PAGE | PARTIAL IMAGE |
|---|---|---|---|
| SELF-DESCRIPTIVE INFORMATION | B | B-2 | B-2-4 |
| COPY-SOURCE INFORMATION | A | A-1 | A-1-2 |
| COPY-DESTINATION INFORMATION | - | - | - |

PARTIAL IMAGE C-4-8 OF DOCUMENT C

|  | DOCUMENT | PAGE | PARTIAL IMAGE |
|---|---|---|---|
| SELF-DESCRIPTIVE INFORMATION | C | C-4 | C-4-8 |
| COPY-SOURCE INFORMATION | A | A-1 | A-1-2 |
| COPY-DESTINATION INFORMATION | - | - | - |

PARTIAL IMAGE A-1-2 OF DOCUMENT A

| | DOCUMENT | PAGE | PARTIAL IMAGE |
|---|---|---|---|
| SELF-DESCRIPTIVE INFORMATION | A | A-1 | A-1-2 |
| COPY-SOURCE INFORMATION | – | – | – |
| COPY-DESTINATION INFORMATION | B | B-2 | B-2-4 |
| COPY-DESTINATION INFORMATION | C | C-4 | C-4-8 |

PARTIAL IMAGE B-2-4 OF DOCUMENT B

| | DOCUMENT | PAGE | PARTIAL IMAGE |
|---|---|---|---|
| SELF-DESCRIPTIVE INFORMATION | B | B-2 | B-2-4 |
| COPY-SOURCE INFORMATION | A | A-1 | A-1-2 |
| COPY-DESTINATION INFORMATION | D | D-2 | D-2-6 |

PARTIAL IMAGE C-4-8 OF DOCUMENT C

| | DOCUMENT | PAGE | PARTIAL IMAGE |
|---|---|---|---|
| SELF-DESCRIPTIVE INFORMATION | C | C-4 | C-4-8 |
| COPY-SOURCE INFORMATION | A | A-1 | A-1-2 |
| COPY-DESTINATION INFORMATION | – | – | – |

PARTIAL IMAGE D-2-6 OF DOCUMENT D

| | DOCUMENT | PAGE | PARTIAL IMAGE |
|---|---|---|---|
| SELF-DESCRIPTIVE INFORMATION | D | D-2 | D-2-6 |
| COPY-SOURCE INFORMATION | B | B-2 | B-2-4 |
| COPY-DESTINATION INFORMATION | – | – | – |

FIG.7C

DOCUMENT EDIT

DOCUMENT B

B-2

B-2-4

100
80
60
40
20
0
JAN. FEB. MAR. APR.

TOKYO
NAGOYA
OSAKA

```
DOCUMENT DISPLAY

DOCUMENT B

LIST OF COPY SOURCES                              ⎫ B-25
         DOCUMENT A    http://host/doc/documentA.pdf   ⎬
         DOCUMENT D    http://host/doc/documentD.pdf   ⎭
         BOOK A        urn:isbn:4-AAAA-AAAA-A
         RFC2141       urn:ietf:rfc:2141

PARTIAL IMAGE A-1-2 OF DOCUMENT A

| | DOCUMENT | PAGE | PARTIAL IMAGE |
|---|---|---|---|
| SELF-DESCRIPTIVE INFORMATION | A | A-1 | A-1-2 |
| COPY-SOURCE INFORMATION | – | – | – |
| COPY-DESTINATION INFORMATION | B | B-2 | B-2-4 |
| COPY-DESTINATION INFORMATION | C | C-4 | C-4-8 |

PARTIAL IMAGE B-2-4 OF DOCUMENT B

| | DOCUMENT | PAGE | PARTIAL IMAGE |
|---|---|---|---|
| SELF-DESCRIPTIVE INFORMATION | B | B-2 | B-2-4 |
| COPY-SOURCE INFORMATION | A | A-1 | A-1-2 |
| COPY-DESTINATION INFORMATION | D | D-2 | D-2-6 |

PARTIAL IMAGE C-4-8 OF DOCUMENT C

| | DOCUMENT | PAGE | PARTIAL IMAGE |
|---|---|---|---|
| SELF-DESCRIPTIVE INFORMATION | C | C-4 | C-4-8 |
| COPY-SOURCE INFORMATION | A | A-1 | A-1-2 |
| COPY-DESTINATION INFORMATION | – | – | – |

PARTIAL IMAGE D-2-6 OF DOCUMENT D

| | DOCUMENT | PAGE | PARTIAL IMAGE |
|---|---|---|---|
| SELF-DESCRIPTIVE INFORMATION | D | D-2 | D-2-6 |
| COPY-SOURCE INFORMATION | B | B-2 | B-2-4 |
| COPY-DESTINATION INFORMATION | – | – | – |

PARTIAL IMAGE A-1-2 OF DOCUMENT A

| | DOCUMENT | PAGE | PARTIAL IMAGE |
|---|---|---|---|
| SELF-DESCRIPTIVE INFORMATION | A | A-1 | A-1-2 |
| COPY-SOURCE INFORMATION | - | - | - |
| COPY-DESTINATION INFORMATION | D | D-2 | D-2-6 |
| COPY-DESTINATION INFORMATION | C | C-4 | C-4-8 |

PARTIAL IMAGE B-2-4 OF DOCUMENT B

| | DOCUMENT | PAGE | PARTIAL IMAGE |
|---|---|---|---|
| *SELF-DESCRIPTIVE INFORMATION* | *B* | *B-2* | *B-2-4* |
| *COPY-SOURCE INFORMATION* | *A* | *A-1* | *A-1-2* |
| *COPY-DESTINATION INFORMATION* | *D* | *D-2* | *D-2-6* |

PARTIAL IMAGE C-4-8 OF DOCUMENT C

| | DOCUMENT | PAGE | PARTIAL IMAGE |
|---|---|---|---|
| SELF-DESCRIPTIVE INFORMATION | C | C-4 | C-4-8 |
| COPY-SOURCE INFORMATION | A | A-1 | A-1-2 |
| COPY-DESTINATION INFORMATION | - | - | - |

PARTIAL IMAGE D-2-6 OF DOCUMENT D

| | DOCUMENT | PAGE | PARTIAL IMAGE |
|---|---|---|---|
| SELF-DESCRIPTIVE INFORMATION | D | D-2 | D-2-6 |
| *COPY-SOURCE INFORMATION* | *A* | *A-1* | *A-1-2* |
| *COPY-DESTINATION INFORMATION* | - | - | - |

FIG.14B

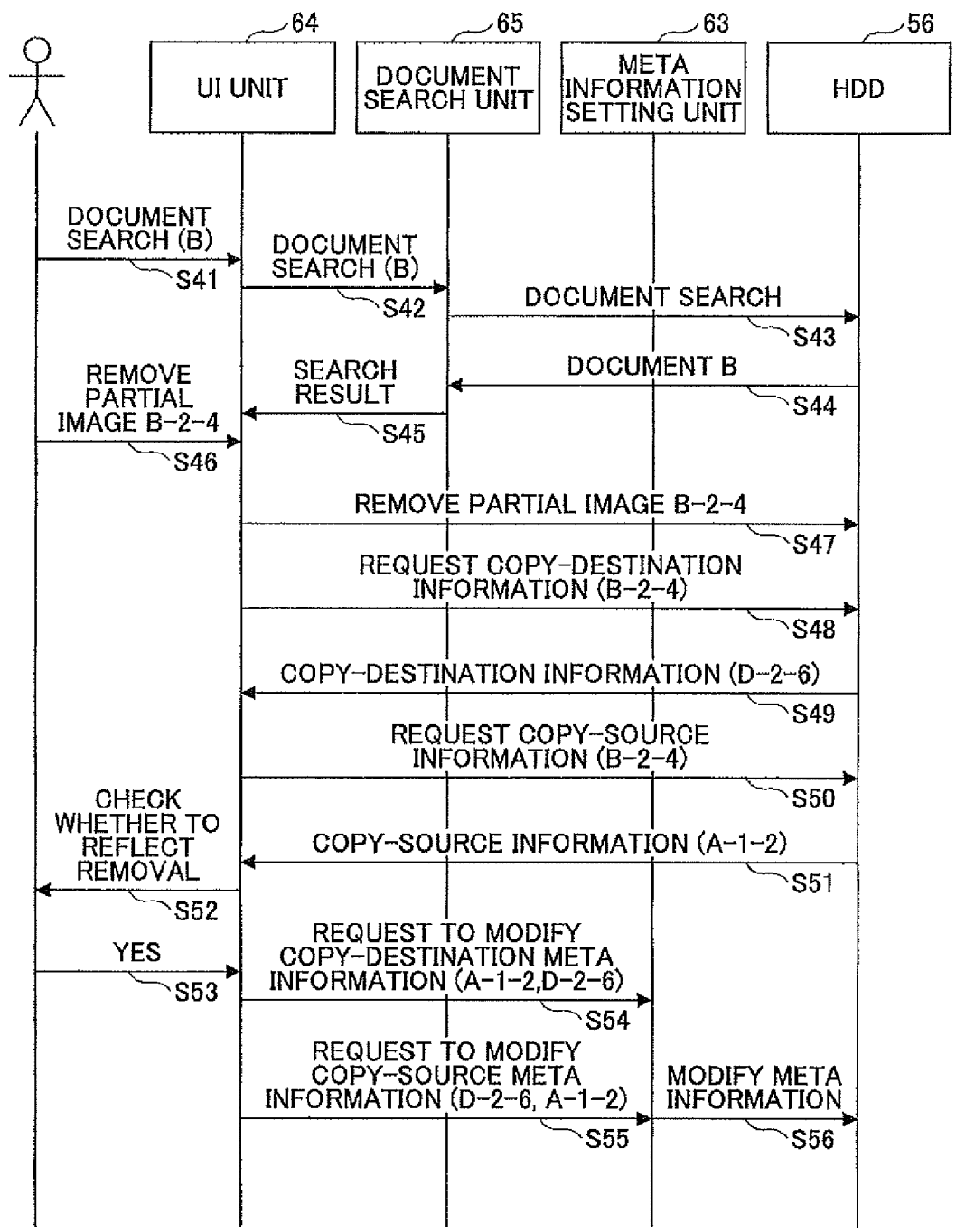

INFORMATION PROCESSING APPARATUS FOR STORING DOCUMENTS WITH PARTIAL IMAGES

BACKGROUND OF THE INVENTION

1. Field of the Invention

The disclosures herein generally relate to an information processing apparatus such as a personal computer, an information processing method performed by the information processing apparatus, a program for implementing functions to control the information processing apparatus, and a computer-readable recording medium having such a program embodied therein.

2. Description of the Related Art

With the rapid spread of computers, it has been becoming general practice to store documents as electronic data while such documents were stored as paper files in the past.

As information processing apparatus having the function to store documents as electronic data, Japanese Patent Application Publication No. 11-25113 discloses an image processing apparatus that detects and extracts image areas inclusive of images and text areas inclusive of character strings from a document (i.e., electronic document), which may be scanned by a scanner or the like and may include images such as drawings, tables, and photographs together with character strings. This information processing apparatus stores the extracted images in memory as search objects, and allows a stored image to be retrieved from the memory by use of an extracted character string as a search query.

Such an information processing apparatus makes it possible to find information needed from a vast amount of information stored as electronic data.

In the related-art information processing apparatus as described above, individual images and texts constituting a document are stored as electronic data. No means is provided for a user to check in what configuration these images and texts are stored. This makes it difficult to manage stored documents.

Further, no means is provided to handle images extracted from documents, which gives rise to a problem in that the reusability is low.

Even if the handling means noted above is provided, it may not be possible to locate detailed information that is necessary to reuse an image when an image (e.g. partial image) extracted from a document is to be copied and pasted onto another document, for example. Further, it may not be possible to identify a person who is currently using the image.

Accordingly, there is a need for a scheme that allows a partial image extracted from a document to be copied and pasted onto another document, and allows meta information corresponding to the original partial image to be referred to, thereby improving the reusability of partial images.

SUMMARY OF THE INVENTION

It is a general object of at least one embodiment of the present invention to provide an information processing apparatus, an information processing method, and a machine-readable medium having a program embedded therein that substantially eliminate one or more problems caused by the limitations and disadvantages of the related art.

In one embodiment, an information processing apparatus for storing and retrieving a document having images and texts in and from a document storage unit includes: a partial image extracting unit configured to extract partial images from input documents; a document registering unit configured to store the input documents and the partial images extracted by the partial image extracting unit in the document storage unit; a meta information setting unit configured to associate a given one of the input documents with the partial images of the given one of the input documents to generate meta information indicative of the association regarding the given one of the input documents; a search unit configured to search for and retrieve one of the input documents as a first document from the document storage unit to display the first document on a display unit; and a user interface unit configured to perform an operation with respect to a partial image of the first document displayed on the display unit in response to an external instruction, wherein the meta information setting unit is configured to add copy-source information indicative of the partial image of the first document to the meta information regarding a second document of the input documents when the user interface unit copies the partial image of the first document and pastes the copied partial image onto the second document.

According to one embodiment, an information processing method for storing and retrieving a document having images and texts in and from a document storage unit includes: a partial image extracting step of extracting partial images from input documents; a document registering step of storing the input documents and the partial images extracted by the partial image extracting step in the document storage unit; a meta information setting step of associating a given one of the input documents with the partial images of the given one of the input documents to generate meta information indicative of the association regarding the given one of the input documents; a search step of searching for and retrieving one of the input documents as a first document from the document storage unit to display the first document on a display unit; and a user interface step of performing an operation with respect to a partial image of the first document displayed on the display unit in response to an external instruction, a meta information updating step of adding copy-source information indicative of the partial image of the first document to the meta information regarding a second document of the input documents when the user interface step copies the partial image of the first document and pastes the copied partial image onto the second document.

According to one embodiment, a machine-readable medium having a program embodied therein is provided for causing a computer to control an information processing apparatus for storing and retrieving a document having images and texts in and from a document storage unit. The program includes: a partial image extracting function code configured to extract partial images from input documents; a document registering function code configured to store the input documents and the partial images extracted by the partial image extracting function code in the document storage unit; a meta information setting function code configured to associate a given one of the input documents with the partial images of the given one of the input documents to generate meta information indicative of the association regarding the given one of the input documents; a search function code configured to search for and retrieve one of the input documents as a first document from the document storage unit to display the first document on a display unit; and a user interface function code configured to perform an operation with respect to a partial image of the first document displayed on the display unit in response to an external instruction, wherein the meta information setting function code is further configured to add copy-source information indicative of the partial image of the first document to the meta information regarding a second document of the input documents when the user interface function code copies the partial image of the first document and pastes the copied partial image onto the second document.

BRIEF DESCRIPTION OF THE DRAWINGS

Other objects and further features of embodiments will be apparent from the following detailed description when read in conjunction with the accompanying drawings, in which:

FIGS. 6A through 6D are drawings illustrating examples of changes in meta information to identify an original and a copy of a partial image displayed on the display unit of FIG. 2;

FIGS. 7A through 7C are drawings illustrating an example of a user operation to paste a partial image of the document A to document B as illustrated in FIGS. 5A and 5B;

FIGS. 11A through 11C are drawings illustrating an example of a user operation to display the copy-source document A as illustrated in FIG. 5A on the document B having a copy partial image as illustrated in FIG. 5B;

FIGS. 14A and 14B are drawings illustrating examples of changes in meta information to identify an original and copy of a partial image upon deleting the partial image B-2-4 of the document B as illustrated in FIG. 5B; and FIG. 15 is a drawing illustrating an example of a communication sequence that is performed by use of the software illustrated in FIG. 3 to remove the partial image B-2-4 of the document B as illustrated in FIG. 5B.

DESCRIPTION OF THE PREFERRED EMBODIMENTS

In the following, the best mode for carrying out the present invention will be described in detail by referring to the accompanying drawings. The following embodiments will be described with reference to an example in which a printer system including a printer and a host computer having information processing functions is used as an image processing system inclusive of an information processing apparatus of the present invention.

[Printer System Configuration]

In the following, the configuration of a printer system according to an embodiment of the present invention will be described by referring to FIG. 1.

Figure 1:
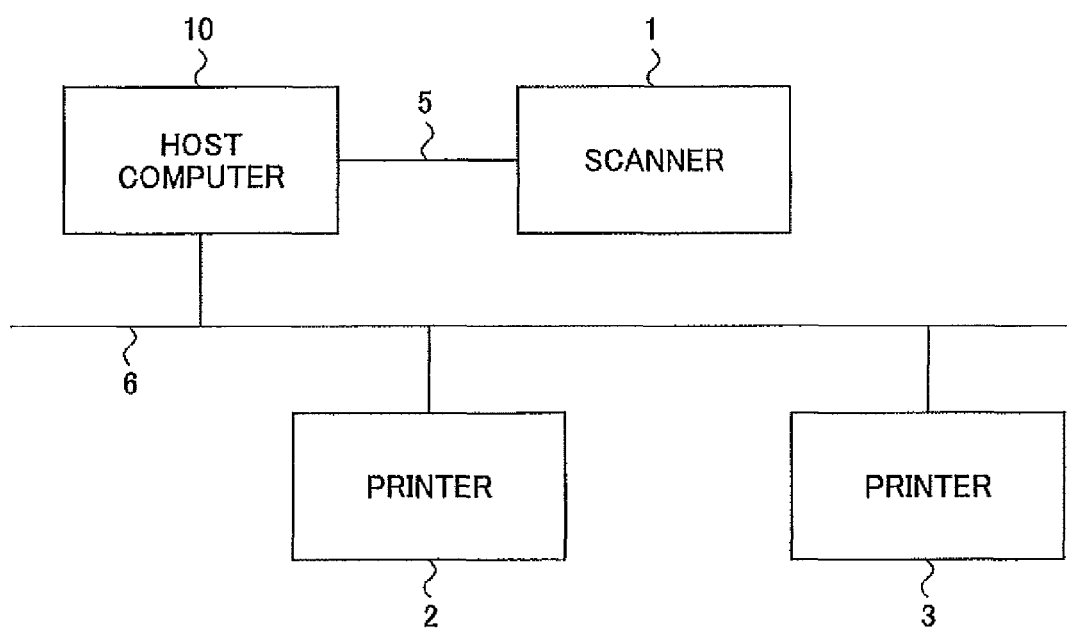
FIG. 1 is a block diagram illustrating an example of the configuration of a printer system according to an embodiment of the present invention.

FIG. 1 is a block diagram illustrating an example of the configuration of the printer system.

The printer system includes a host computer 10, a scanner 1, and printers 2 and 3.

The host computer 10 is directly connected to the scanner 1 through a cable 5, and is indirectly connected to the printers 2 and 3 through a network 6 such as a LAN (Local Area Network).

The host computer 10 is an information processing apparatus such as a personal computer (PC) or workstation, and may serve as a client computer or print server. In the case of a printer server system, a client computer may be a Web client (e.g., Web browser) of a print server that provides a print service.

An application running on the host computer 10 can print to a selected one of the printers 2 and 3 through a printer driver.

The scanner 1 serves as a scanner means (e.g., document input means) to acquire an electronic document (which will hereinafter be simply referred to as a "document") that is obtained by optically scanning a paper document (i.e., original document image). It should be noted that the scanner 1 and the host computer 10 may together be referred to as an image processing apparatus. In place of the scanner 1, another device such as a digital camera may be used to provide the functions of a document input means.

Each of the printers 2 and 3 is a print apparatus that forms (i.e. prints) an image on a print medium such as a paper sheet in accordance with print data (e.g., code data) supplied from the host computer 10. The printers 2 and 3 have only the print function, and may be a laser printer, a LED printer, an inkjet printer, or the like. In place of the printers 2 and 3, a print apparatus such as a facsimile apparatus, a digital multifunctional machine, or a digital copier having an additional function such as a copy function in addition to the print function may be used. Each of the printers 2 and 3 may be provided with a print server function.

[Hardware Configuration of Host Computer]

In the following, a hardware configuration of the host computer 10 illustrated in FIG. 1 will be described by referring to FIG. 2.

Figure 2:
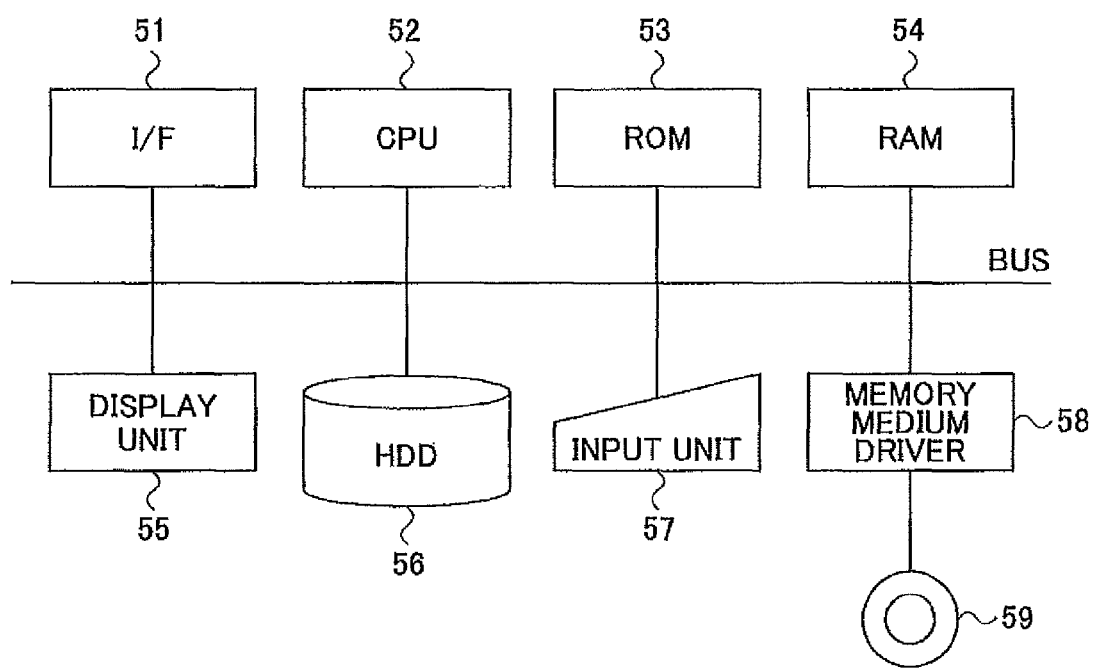
FIG. 2 is a block diagram illustrating an example of the hardware configuration of the host computer illustrated in FIG. 1.

FIG. 2 is a block diagram illustrating an example of the hardware configuration of the host computer 10.

The host computer 10 includes an interface (I/F) unit 51, a CPU 52, a ROM 53, a RAM 54, a display unit 55, an HDD 56, an input unit 57, and a memory medium driver 58.

The interface unit 51 serves as a communication means to communicate through the cable 5 with the scanner 1 serving as an external apparatus and to communicate through the network 6 with the printers 2 and 3. Alternatively, provision may be made such that communication is performed with the scanner 1 through the network 6 and with the printers 2 and 3 through the cable 5. Further, communication with the scanner 1 may be performed through an external apparatus such as a server. Moreover, communication may be performed with an external apparatus having the function of the scanner 1 (i.e., document input means). In such a case, the interface unit 51 may also provide the function of the document input means.

The CPU 52 is a central processing unit for managing and controlling the host computer 10.

The ROM 53 is a read-only memory means that stores programs executed by the CPU 52.

The RAM 54 is a readable and writable memory means that provides a memory space in which the programs executed by the CPU 52 are laid out, and that is used as a work area by various processes.

The display unit 55 displays various types of data and operation screens (e.g., windows), and may be a CRT display device, an LCD display device, or the like.

The HDD 56 is a large-volume data storage means for storing data and programs. The HDD 56 also serves as a document storage means.

The input unit 57 is used by a user to enter various types of operational information, and may be a keyboard and pointing device such as a mouse.

Alternatively, the display unit 55 may be implemented together with a touch panel. In such a case, various types of operations may be performed on the operating screens displayed on the display unit 55 to instruct the CPU 52 to perform corresponding types of processing.

The memory medium driver 58 serves as a recording and reproducing means for recording and reproducing information to and from a memory medium (i.e., recording medium) 59.

The memory medium 59 is a computer-readable recording medium (i.e., memory means) such as an MO, CD-R, CD-RW, DVD+R, DVD+RW, DVD-R, DVD-RW, DVD-RAM, or the like that is detachable from the host computer 10. The memory medium 59 has programs (i.e., software) stored therein for performing computer control. The memory medium 59 may also serve as a document storage means.

In the host computer 10 having the above-described configuration, the CPU 52 may read programs as needed from the memory medium 59 through the memory medium driver 58 in response to instruction from an operator using the input unit 57, and may install these programs in the HDD 56.

Upon power-on, the CPU 52 reads various programs and data inclusive of an OS (operating system), applications, and user interfaces from the HDD 56 in accordance with the boot loader (i.e., boot program) stored in the ROM 53, and writes these programs and data to the RAM 54. The CPU 52 then operates in accordance with these programs (i.e., executes these programs selectively according to need). Through these operations, the CPU 52 controls the interface unit 51, the display unit 55, the HUD 56, the input unit 57, and the like to implement various functions inclusive of a partial image extracting function, a document registering function, a meta information setting function, a search function, a processing function, and a meta information updating function.

[Software Configuration of Host Computer]

In the following, a software configuration of the host computer 10 illustrated in FIG. 1 will be described by referring to FIG. 3. To be precise, the processes by programs (i.e., software) are performed by the CPU 52 executing these programs. For the sake of convenience of explanation, the following description will be provided as if these programs themselves performed their respective operations. Such mode of explanation may be used throughout the specification when describing programs performing some operations.

Figure 3:
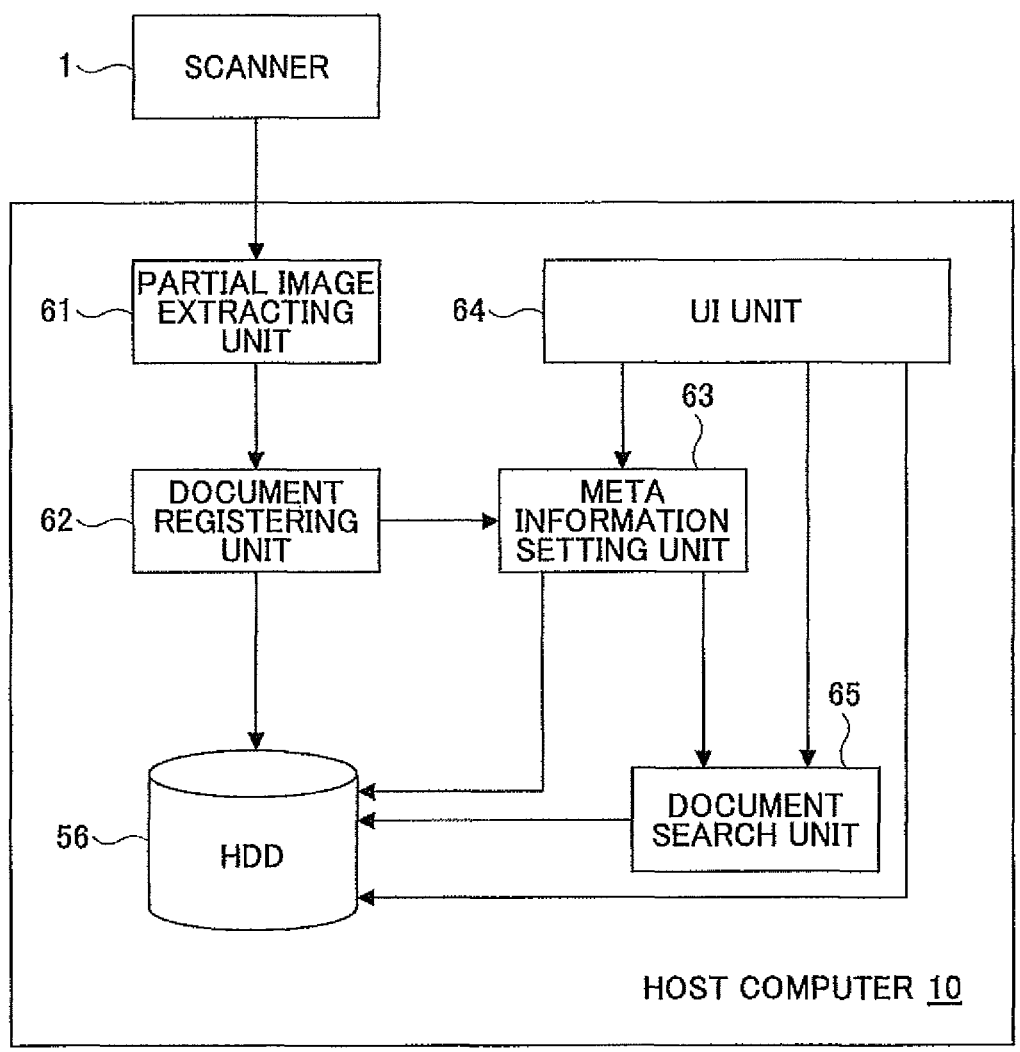
FIG. 3 is a block diagram illustrating an example of the software configuration of the host computer illustrated in FIG. 1.

FIG. 3 is a block diagram illustrating an example of the software configuration of the host computer 10.

A partial image extracting unit 61 analyzes the structure of a document scanned by the scanner 1 (which includes images such as drawings, tables, and photographs and character strings mixed together). The partial image extracting unit 61 detects (i.e., recognizes) image areas inclusive of images and character areas inclusive of character strings (i.e., texts) in the scanned document, thereby extracting partial images. The partial image extracting unit 61 includes an OCR unit (i.e., optical character recognition means) to perform character recognition with respect to the character strings appearing in the extracted character areas. With this OCR function, the partial image extracting unit 61 can detect (recognize) partial image identifying information, page identifying information, and document identifying information, which constitute meta information as will be later described. If a partial image of each page constituting a document does not have page identifying information (i.e., page number), a counter or the like (not shown) may be used to generate page identifying information.

A document registering unit 62 registers in the HDD 56 the document scanned by the scanner 1 and the partial images extracted by the partial image extracting unit 61 from the document. In so doing, a meta information setting unit 63 is used to associate the document, the partial images, and those pages of the document which contain the partial images with each other for storage in the HDD 56, thereby setting meta information indicative of this association.

The document scanned by the scanner 1 and the meta information may alternatively be stored in another memory device of the host computer 10 such as the memory medium 59 instead of the HDD 56, or may be transmitted to a document registration server (not shown) connected through the network 6 for storage in a memory device of this server.

A UI (user interface) unit 64 is operated through the input unit 57 (i.e., from an external source) to use a document search unit 65 to search for documents, pages, and partial images from the HDD 56 for presentation on the display unit 55. The UI unit 64 is also used to edit the document presented on the display unit 55. Further, the meta information setting unit 63 may be used to set meta information to the documents, pages, and partial images retrieved through the search.

[Concepts of Copy-Source Information, Copy-Destination Information, and Self-Descriptive Information]

In the following, the concepts of copy-source information, copy-destination information, and self-descriptive information constituting meta information that is set by the meta information setting unit 63 illustrated in FIG. 3 will be described by referring to FIG. 4.

Figure 4:
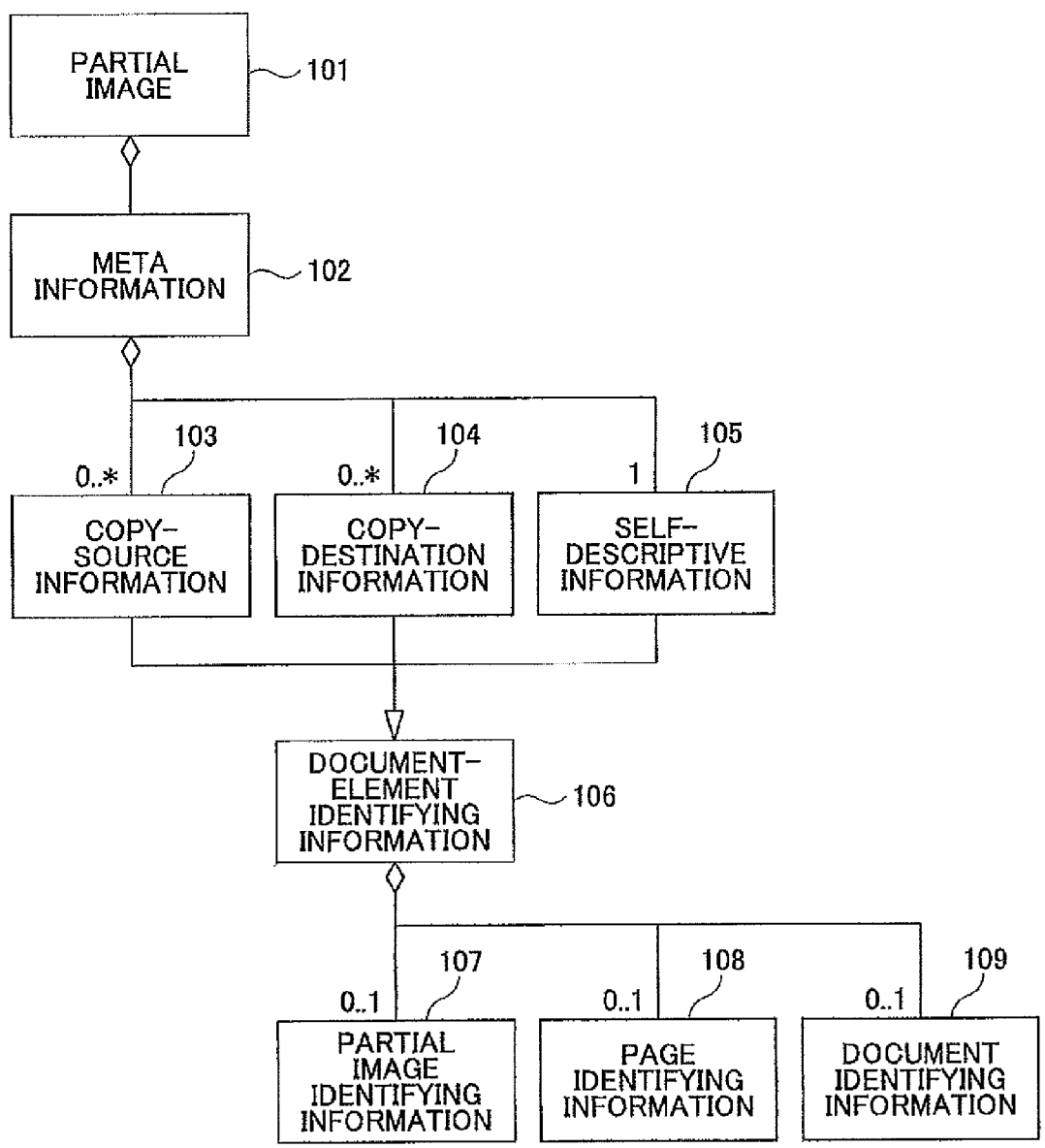
FIG. 4 is a block diagram illustrating an example of the concepts of copy-source information, copy-destination information, and self-descriptive information constituting meta information that is set by a meta information setting unit illustrated in FIG. 3.

FIG. 4 is a block diagram illustrating an example of the concepts of copy-source information, copy-destination information, and self-descriptive information.

A partial image 101 extracted by the partial image extracting unit 61 of FIG. 3 has meta information 102, which includes copy-source information 103, copy-destination information 104, and self-descriptive information 105.

The copy-source information 103, the copy-destination information 104, and the self-descriptive information 105 are document-element identifying information 106 for identifying document elements.

The document-element identifying information 106 has partial image identifying information 107 for identifying a partial image, page identifying information 108 for identifying each page constituting a document, and document identifying information 109 for identifying a document. The partial image identifying information 107 may be a figure number, a table number, and a photograph number. The page identifying information 108 may be a page number as previously described. The document identifying information 109 may be a document title, which exists in the partial image of the top page or the like.

The copy-source information 103 includes information about the original. The copy-source information 103 does not exist in meta information in its initial state.

The copy-destination information 104 includes information about the copy. The copy-destination information 104 does not exist in meta information in its initial state.

The self-descriptive information 105 is information about the partial image 101 itself. Only one item of self-descriptive information 105 exists in meta information in its initial state.

The document-element identifying information described above may be universally unique by taking into account the URI (Uniform Resource Identifier) system and the like used outside the printer system (information processing system) of interest, or may be unique only within the printer system. Further, the document-element identifying information 106 may be directed to non-electronic objects. If an original is a book or the like that is not provided as electronic data, ISBN (International Standard Book Number) may be used.

In this example, the copy-source information and copy-destination information are described as being at a single level. This is not a limiting example. It should be noted that multi-stage information may be used to describe an original of an original, for example.

[Original and Copy of Partial Image]

In the following, an original and a copy of a partial image displayed on the display unit 55 of FIG. 2 will be described by referring to FIGS. 5A through 5D.

FIGS. 5A through 5D are drawings illustrating an original and a copy of a partial image displayed on the display unit 55 of FIG. 2.

In this example, four documents A, B, C, and D are used.

Figure 5A:
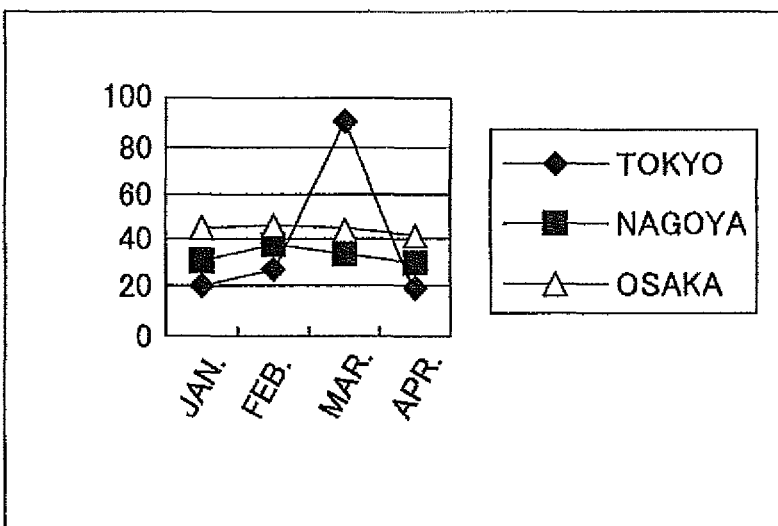
FIGS. 5A through 5D are drawings illustrating an original and a copy of a partial image displayed on the display unit of FIG. 2.

As shown in FIG. 5A, the document A includes a partial image A-1-2 (line chart in this example) on the first page A-1. This partial image A-1-2 will be copied. In such a case, the partial image A-1-2 serves as an original partial image, and the first page A-1 serves as an original page.

Figure 5B:
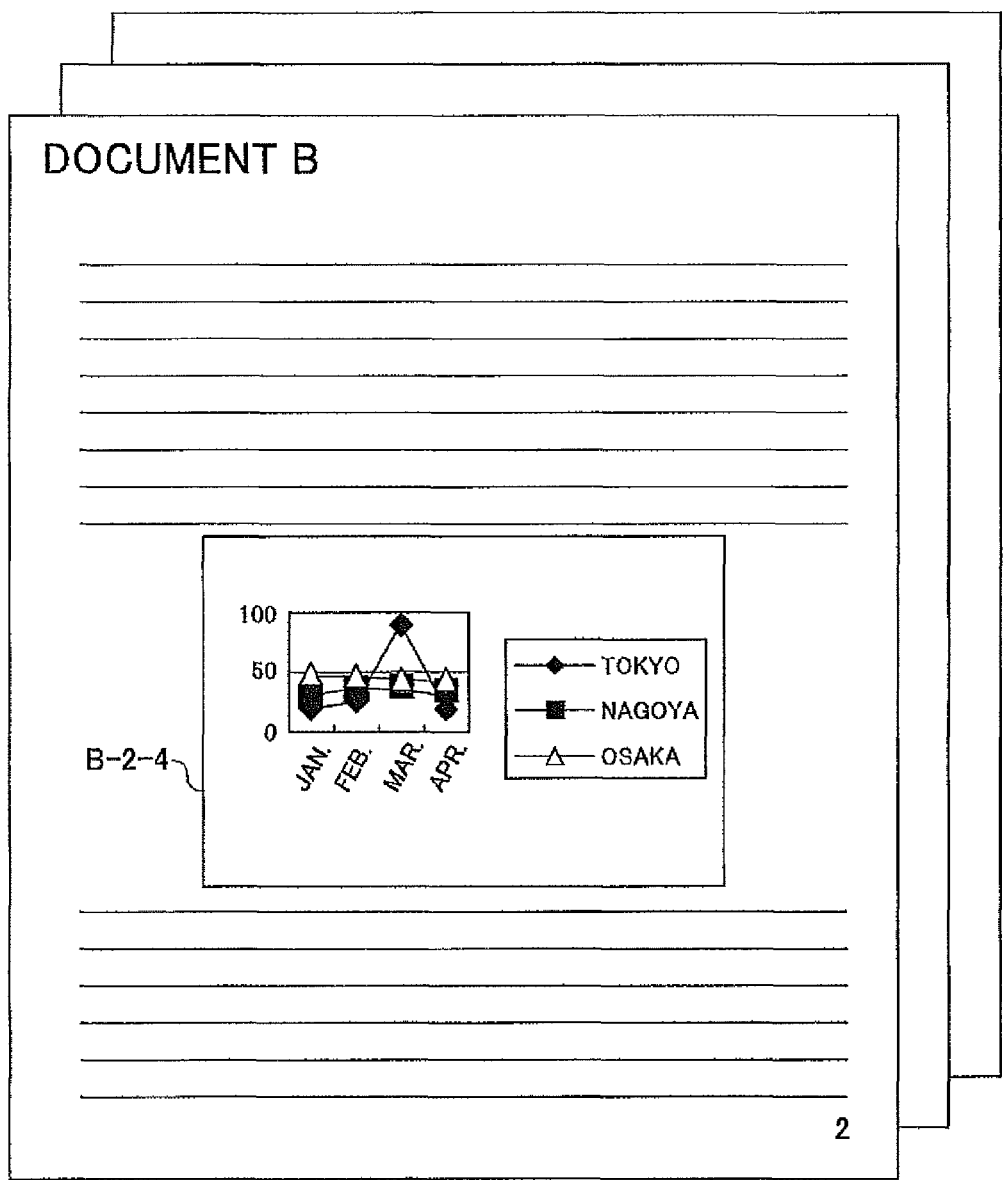

As shown in FIG. 5B, the document B includes a partial image B-2-4 pasted onto the second page B-2, which is made by copying the partial image A-1-2 from the first page A-1 of the document A. In this case, the partial image B-2-4 serves as a copy partial image, and the second page B-2 serves as a copy page. The copy partial image B-2-4 has a reduced size compared with the original partial image A-1-2.

Figure 5C:
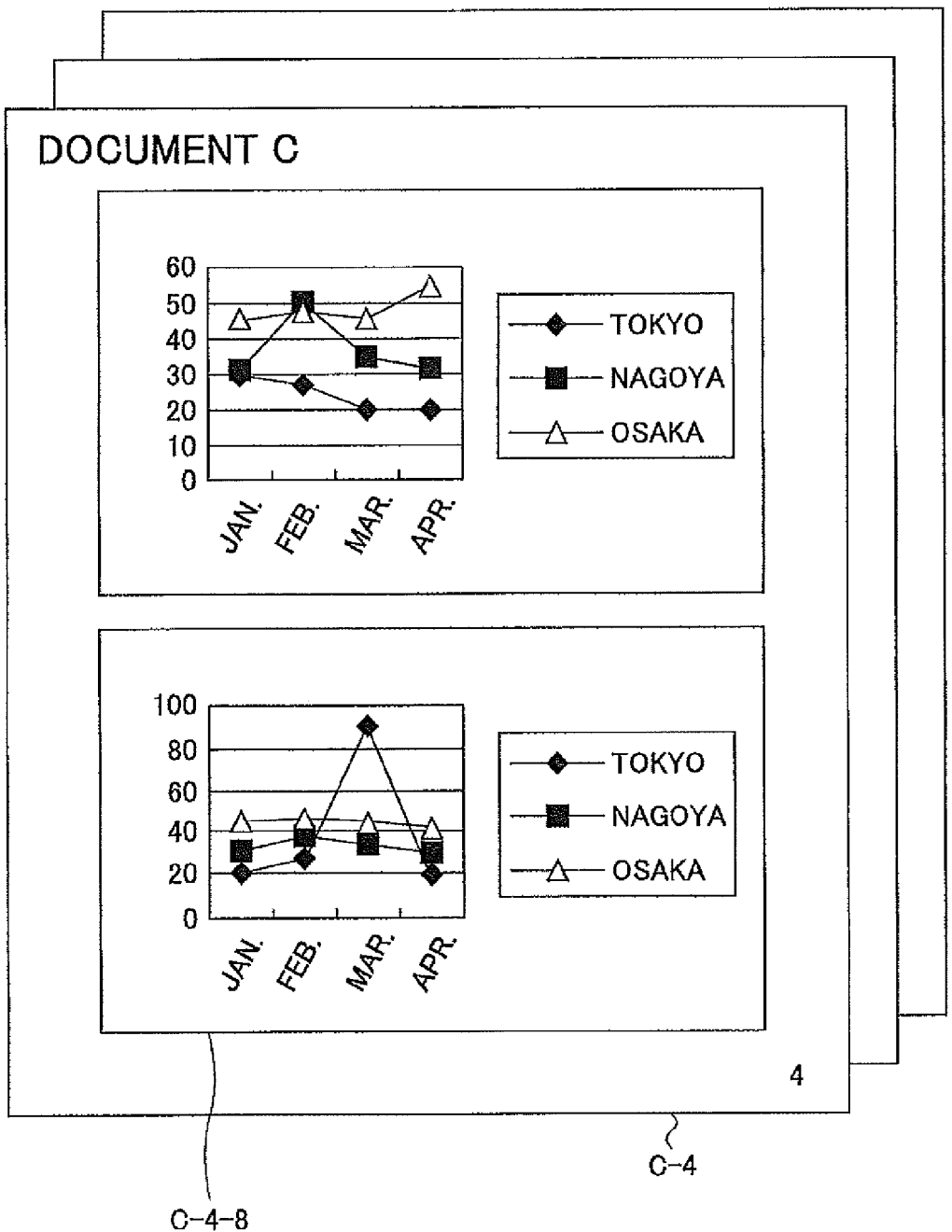

As shown in FIG. 5C, like the document B, the document C includes a partial image C-4-8 pasted onto the fourth page C-4, which is made by copying the partial image A-1-2 from the first page A-1 of the document A. In such a case, the partial image C-4-8 serves as a copy partial image, and the fourth page C-4 serves as a copy page. The copy partial image C-4-S also has a reduced size compared with the original partial image A-1-2.

Figure 5D:
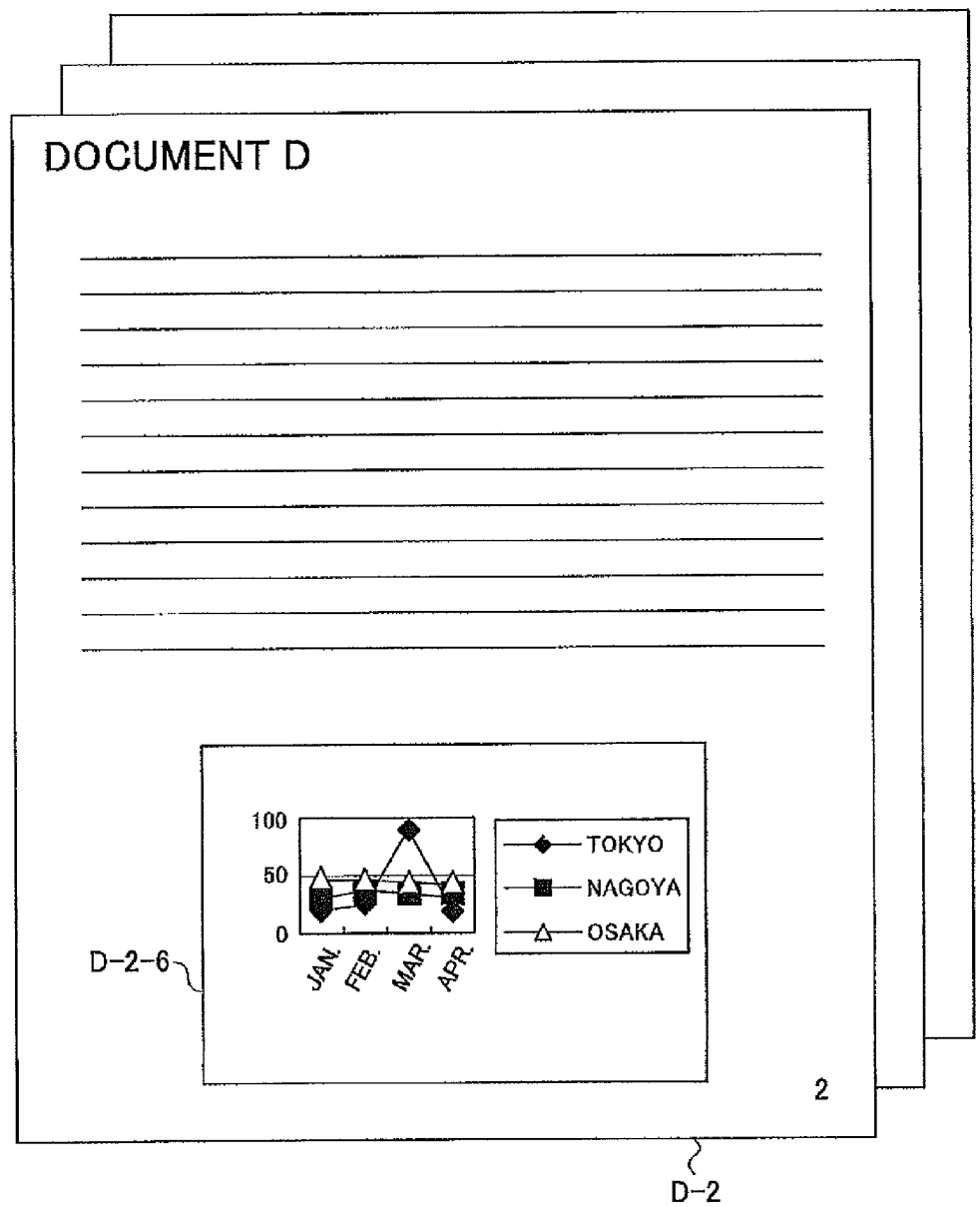

As shown in FIG. 5D, the document D includes a partial image D-2-6 pasted onto the second page D-2, which is made by copying the partial image B-2-4 as pasted onto the second page B-2 of the document B. In this case, the partial image D-2-6 serves as a copy partial image, and the partial image B-2-4 of the document B illustrated in FIG. 5B serves as an original partial image. Further, the second page D-2 serves as a copy page, and the second page B-2 of the document B serves as an original page.

There is no direct parent-child relationship between the document D and the document A, which are, however, related to each other through the partial image B-2-4 of the document B.

[Change in Meta Information to Identify Original and Copy of Partial Image]

In the following, changes in meta information to identify an original and a copy of a partial image displayed on the display unit 55 of FIG. 2 will be described by referring to FIG. 6.

FIGS. 6A through 6D are drawings illustrating examples of changes in meta information to identify an original and a copy of a partial image displayed on the display unit 55 of FIG. 2.

FIG. 5A illustrates a case in which only the document A having the partial image A-1-2 on the first page A-1 can be displayed on the display unit 55 (i.e., only the document A is in existence). In such a case, meta information for identifying an original and copy of a partial image that can be displayed on the display unit 55 is directed only to the partial image A-1-2 of the document A as illustrated in FIG. 6A This meta information includes only the self-descriptive information indicative of the document A, the page A-1, and the partial image A-1-2.

Figure 6B:
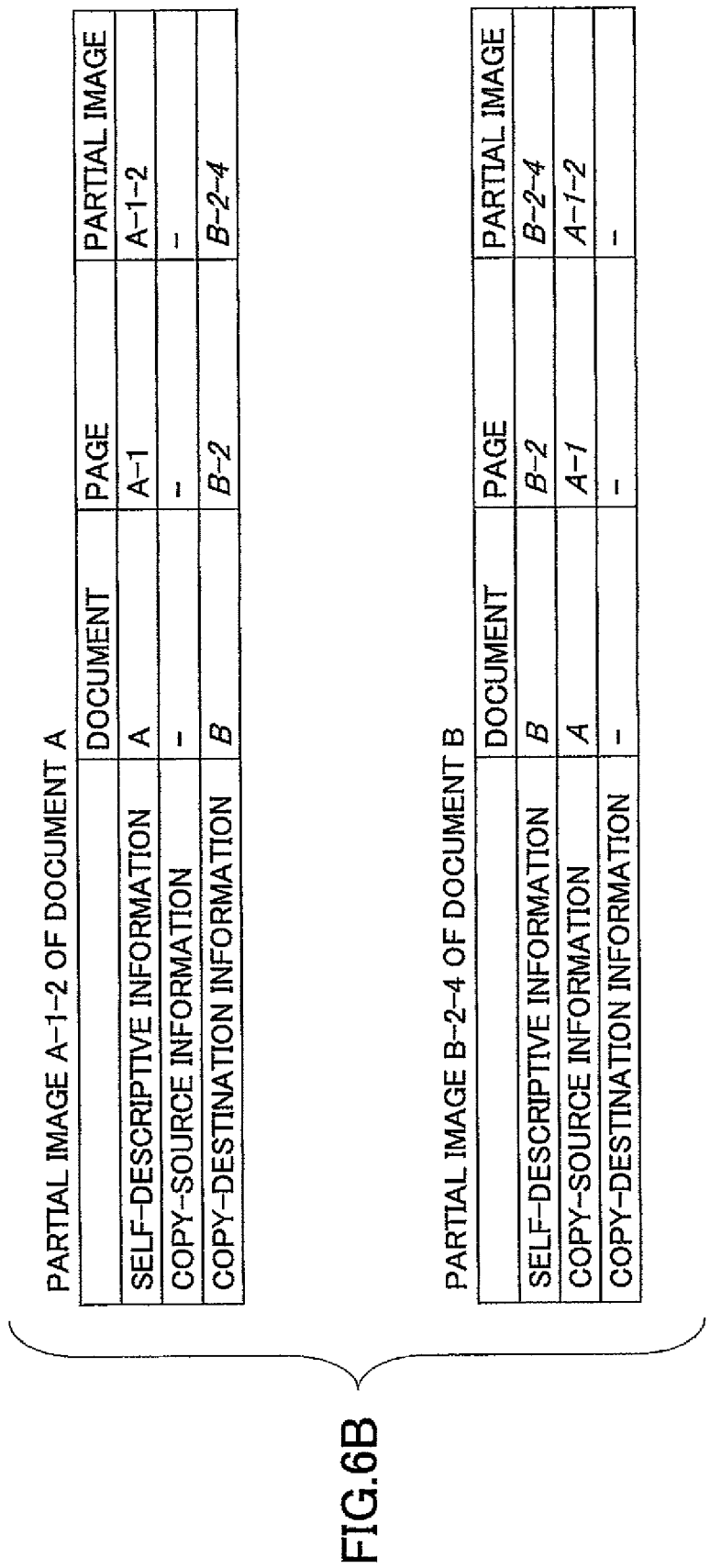

From the state described above, the partial image A-1-2 of the document A is copied and pasted as the partial image B-2-4 onto the second page B-2 of the document B as illustrated in FIG. 5B (i.e., a partial image is copied from the document A and pasted onto the document B). In this case, the meta information about the partial image A-1-2 of the document A is updated, so that information indicative of the document B, the page B-2, and the partial image B-2-4 is added as copy-destination information, as illustrated in FIG. 6B.

Further, meta information about the partial image B-2-4 of the document B is added (i.e., newly created). This meta information includes the self-descriptive information indicative of the document B, the page B-2, and the partial image B-2-4 as well as the copy-source information indicative of the document A, the page A-1, and the partial image A-1-2.

From the state described above, the partial image A-1-2 of the document A is copied and pasted as the partial image C-4-8 onto the fourth page C-4 of the document C as illustrated in FIG. 5C (i.e., a partial image is copied from the document A and pasted onto the document C). In this case, the meta information about the partial image A-1-2 of the document A is updated, so that information indicative of the document C, the page C-4, and the partial image C-4-8 is added as second copy-destination information, as illustrated in FIG. 6C.

Further, meta information about the partial image C-4-8 of the document C is added (i.e., newly created). This meta information includes the self-descriptive information indicative of the document C, the page C-4, and the partial image C-4-8 as well as the copy-source information indicative of the document A, the page A-1, and the partial image A-1-2.

From the state described above, the partial image B-2-4 of the document B is copied and pasted as the partial image D-2-6 onto the second page D-2 of the document D as illustrated in FIG. 5D (i.e., a partial image is copied from the document B and pasted onto the document D). In this case, the meta information about the partial image B-2-4 of the document B is updated, so that information indicative of the document D, the page D-2, and the partial image D-2-6 is added as copy-destination information, as illustrated in FIG. 6D.

Further, meta information about the partial image D-2-6 of the document D is added (i.e., newly created). This meta information includes the self-descriptive information indicative of the document D, the page D-2, and the partial image D-2-6 as well as the copy-source information indicative of the document B, the page B-2, and the partial image B-2-4.

[User Operation to Paste Partial Image of Document A to Document B]

In the following, a user operation to paste a partial image of the document A to document B as illustrated in FIGS. 5A and 5B will be described by referring to FIGS. 7A through 7C. It should be noted that when a document is to be displayed on the display unit 55, some operation needs to be performed to select and display a desired page. For the sake of convenience of explanation, a description of such an operation will be omitted here. Further, a size change operation may be necessary after a partial image is copied and pasted. A description of such an operation will also be omitted. The omission of descriptions of these operations will also apply in the case of FIG. 8 and subsequent figures.

Figure 7A:
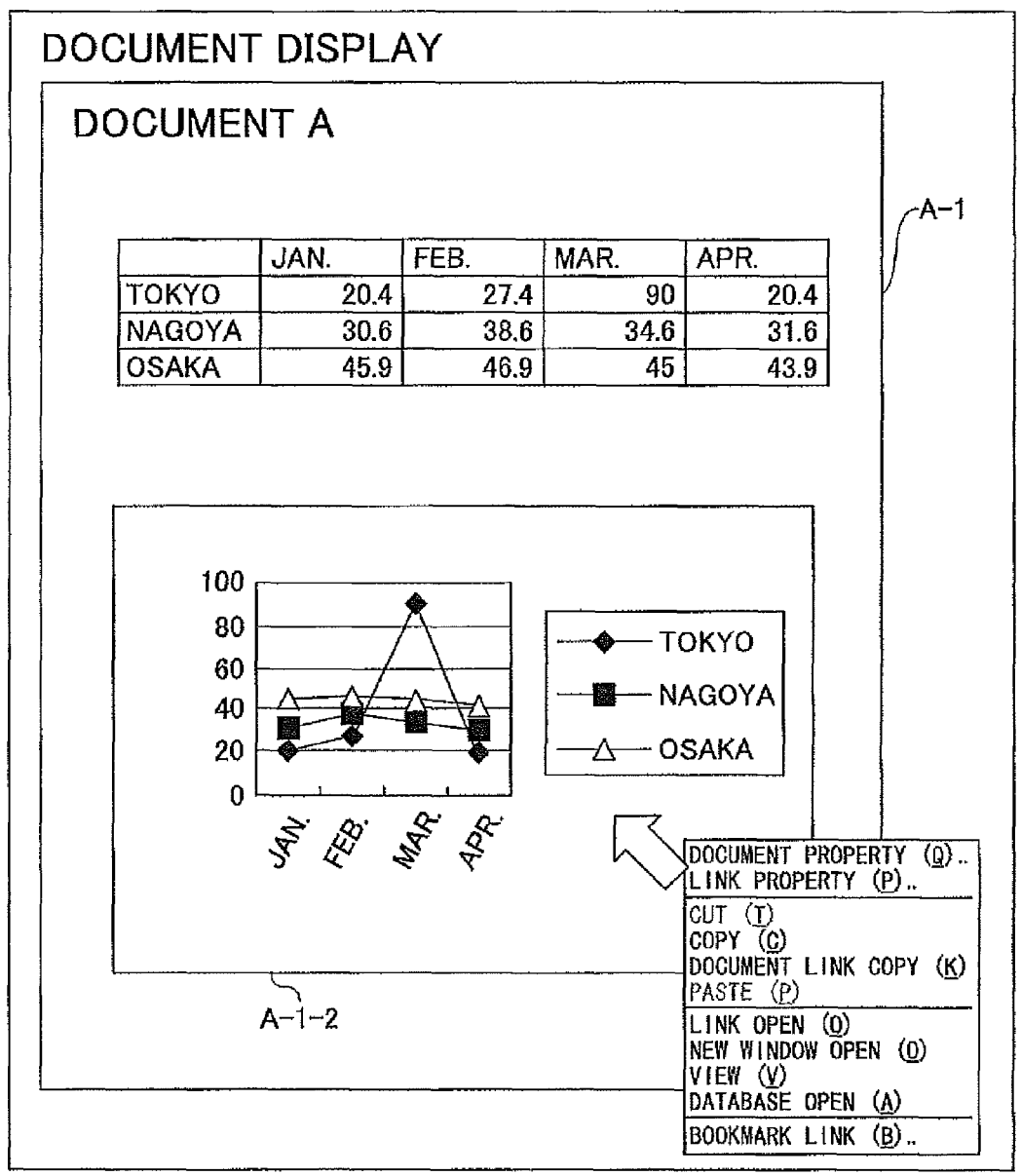
Figure 7B:
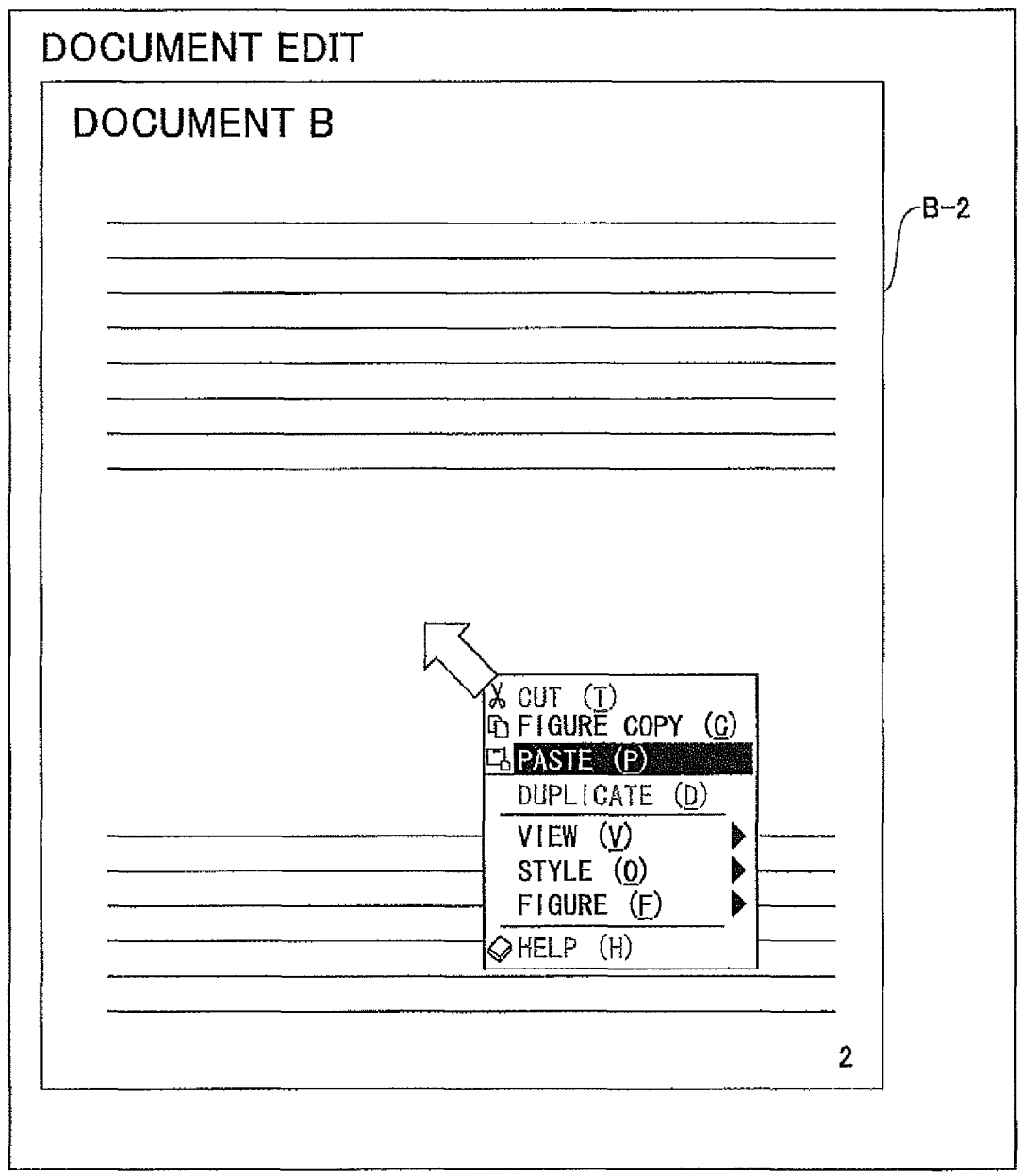

FIGS. 7A through 7C are drawings illustrating an example of a user operation to paste a partial image of the document A to document B as illustrated in FIGS. 5A and 5B.

On the document display screen displayed on the display unit 55, the document A illustrated in FIG. 5A is initially displayed as illustrated in FIG. 7A. A user operation is performed through the input unit 57 to copy the partial image (line chart) A-1-2, and, then, a document edit screen is opened as shown in FIG. 7B to display the document B (i.e., the document B is displayed to be edited).

Thereafter, a user operation is performed on the document edit screen of the document B to paste the partial image (line chart) A-1-2 of the document A onto the document B as the partial image B-2-4 of the document B as illustrated in FIG. 7C.

In the above-described operation, the printer system of the present embodiment may allow information about the original to be deleted upon pasting a partial image of a document. A user determination may be required to delete the information about the original.

[Communication Sequence of Copying and Pasting Partial Image of Document A to Documents B and C and Copying and Pasting Copy Partial Image of Document B to Document D]

In the following, a communication sequence that is performed by use of the software illustrated in FIG. 3 upon copying and pasting the partial image of the document A to the documents B and C and copying and pasting the copy partial image of the document B to the document D as illustrated in FIGS. 5A through 5D will be described by referring to FIG. 8. Among the processes and user operations of the above-noted copying and pasting, those which have already been described will be described only briefly.

Figure 8:
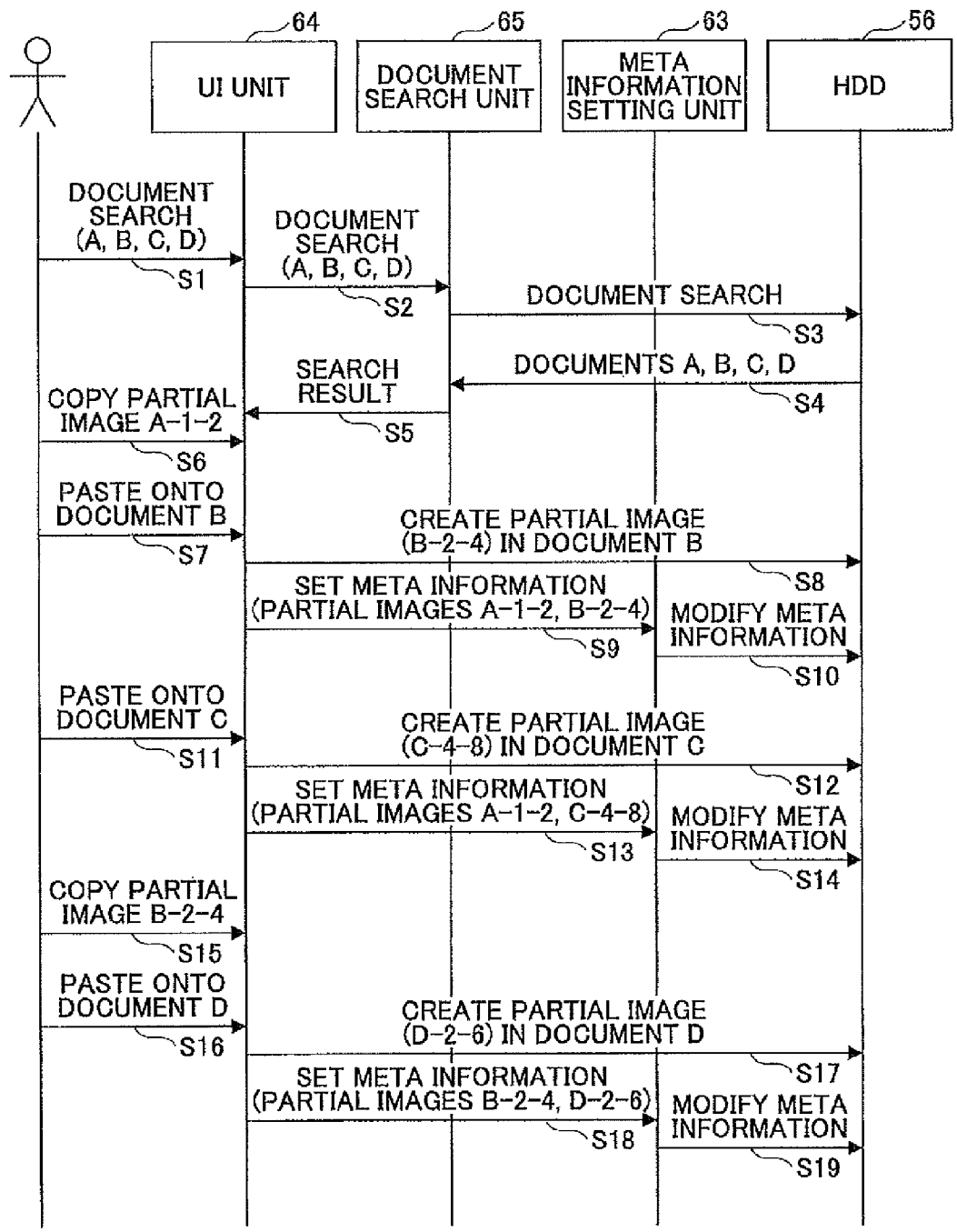
FIG. 8 is a drawing illustrating an example of a communication sequence that is performed by use of the software illustrated in FIG. 3 upon copying and pasting a partial image of a document A to documents B and C and copying and pasting the copy partial image of the document B to a document D as illustrated in FIGS. 5A through 5D.

FIG. 8 is a drawing illustrating an example of a communication sequence that is performed by use of the software illustrated in FIG. 3 upon copying and pasting the partial image of the document A to the documents B and C and copying and pasting the copy partial image of the document B to the document D as illustrated in FIGS. 5A through 5D.

A user operation is performed to request a search of the documents A, B, C, and D as illustrated in FIGS. 5A through 5D (S1). In response, the UI unit 64 transmits a search request to the document search unit 65 (S2).

Upon receiving the search request, the document search unit 65 searches for the documents A, B, C, and D in the HDD 56 to retrieve the documents A, B, C, and D from the HDD 56 (S3, S4). The document search unit 65 sends the retrieved documents to the UT unit 64 as search results (S5).

Upon receiving the documents A, B, C, and D from the document search unit 65, the UI unit 64 displays the first document A in the document display screen (e.g., window) on the display unit 55 (i.e., opens a document display screen for the document A).

A user operation is then performed to copy the partial image A-1-2 of the document A (S6). In response, the UT unit 64 copies the partial image A-1-2.

Although not illustrated, a user operation is performed to edit the document B, so that the UI unit 64 opens a document edit screen to display the document B.

When an instruction is given to paste the partial image onto the document B (S7), the UI unit 64 pastes the partial image A-1-2 of the document A onto the document B as the partial image B-2-4.

Upon completing the pasting of the partial image B-2-4 onto the document B, the UI unit 64 performs a process of creating the partial image B-2-4 in the document B stored in the HDD 56 (S8). Further, the UI unit 64 transmits a request to set meta information to the meta information setting unit 63, wherein the request includes indications of the instructions given in steps S6 and S7.

Upon receiving the meta information setting request, the meta information setting unit 63 updates (modifies) the meta information stored in the HDD 56 based on the instructions contained in the meta information setting request (S10).

A user operation is subsequently performed to request to edit the document C. A document edit screen is opened to display the document C. An instruction is then given to paste the partial image A-1-2 onto the document C (S11). In response, the UI unit 64 pastes the partial image A-1-2 onto the document C as the partial image C-4-8.

Upon completing the pasting of the partial image C-4-8 onto the document C, the UI unit 64 performs a process of creating the partial image C-4-8 in the document C stored in the HDD 56 (S12). Further, the UI unit 64 transmits a request to set meta information to the meta information setting unit 63, wherein the request includes indications of the instructions given in steps S6 and S11 (S13).

Upon receiving the meta information setting request, the meta information setting unit 63 updates (modifies) the meta information stored in the HDD 56 based on the instructions contained in the meta information setting request (S14).

A user operation is subsequently performed to request to display the document B, so that the UI unit 64 opens a document display screen for the document B.

A user operation is then performed to copy the partial image B-2-4 of the document B (S15). In response, the UI unit 64 copies the partial image B-2-4.

A user operation is subsequently performed to request to edit the document D, so that the UI unit 64 opens a document edit screen for the document D.

When an instruction is given to paste the partial image onto the document D (S16), the UI unit 64 pastes the partial image B-2-4 of the document B onto the document D as the partial image D-2-6.

Upon completing the pasting of the partial image D-2-6 onto the document D, the UI unit 64 performs a process of creating the partial image D-2-6 in the document D stored in the HDD 56 (S17). Further, the UI unit 64 transmits a request to set meta information to the meta information setting unit 63, wherein the request includes indications of the instructions given in steps S15 and S16 (S18).

Upon receiving the meta information setting request, the meta information setting unit 63 updates (modifies) the meta information stored in the HDD 56 based on the instructions contained in the meta information setting request (S19).

[User Operation to Reflect Change Made to Original Partial Image in Copy Partial Image]

In the following, a user operation to reflect a change made to an original partial image in a copy partial image will be described by referring to FIGS. 9A through 9D.

FIGS. 9A through 9D are drawings illustrating an example of a user operation to reflect a change in the copy partial images of the documents B and C illustrated in FIGS. 5B and 5C, respectively, upon changing the original partial image of the document A illustrated in FIG. 5A.

Figure 9A:
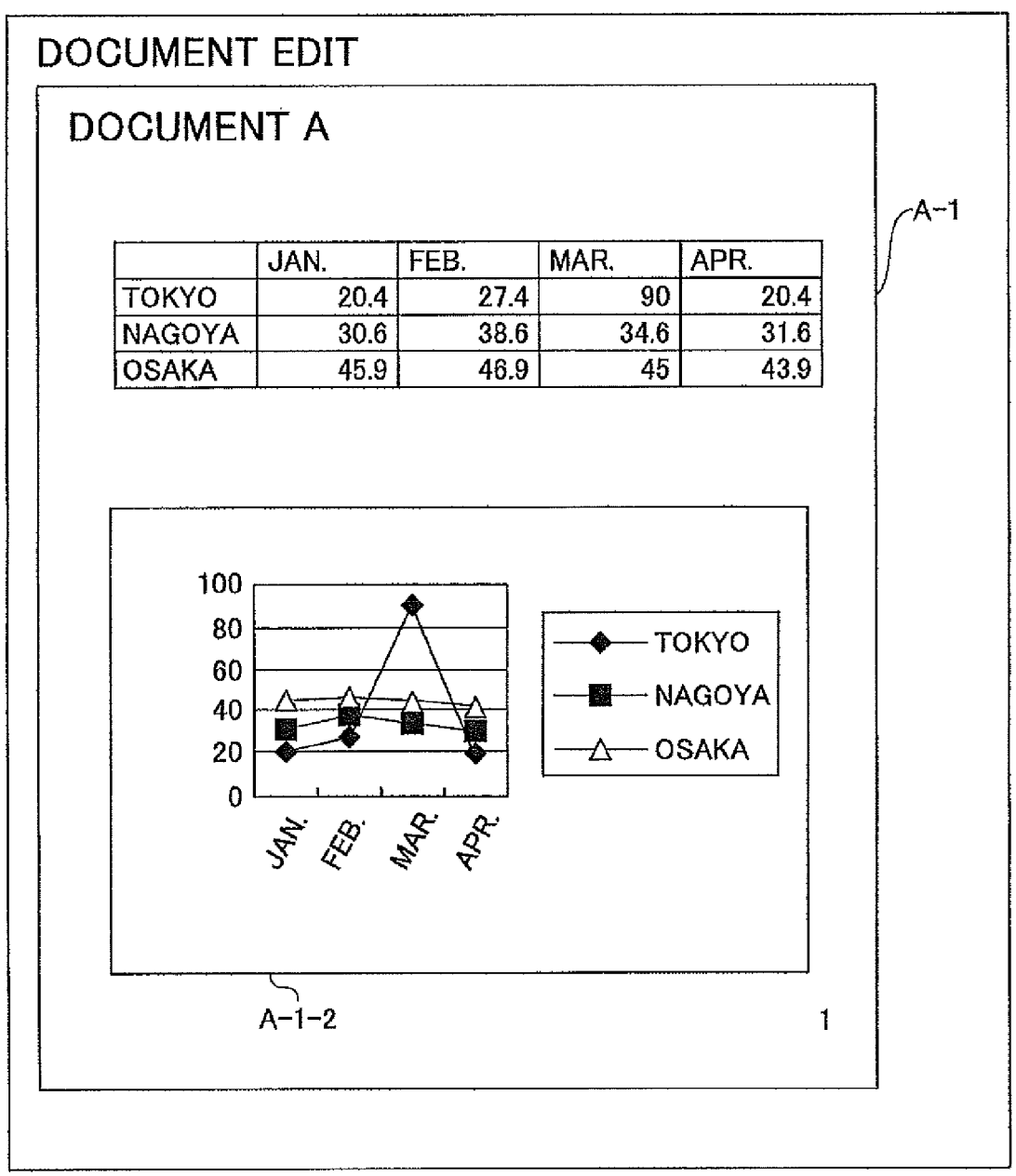
FIGS. 9A through 9D are drawings illustrating an example of a user operation to reflect a change in the copy partial images of the documents B and C illustrated in FIGS. 5B and 5C, respectively, upon changing the original partial image of the document A illustrated in FIG. 5A.
Figure 9B:
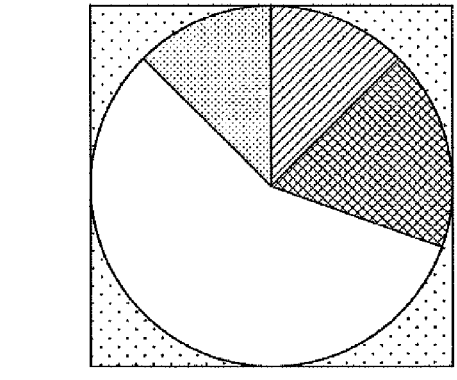

When a user operation is performed to request to edit the document A, the document A as illustrated in FIG. 5A is displayed in a document edit screen on the display unit 55 as illustrated in FIG. 9A. When the partial image A-1-2 is changed as illustrated in FIG. 9B, the message "Reflect this change in copies?" is displayed to request confirmation as to whether this change to the partial image needs to be reflected in the copies.

Figure 9C:
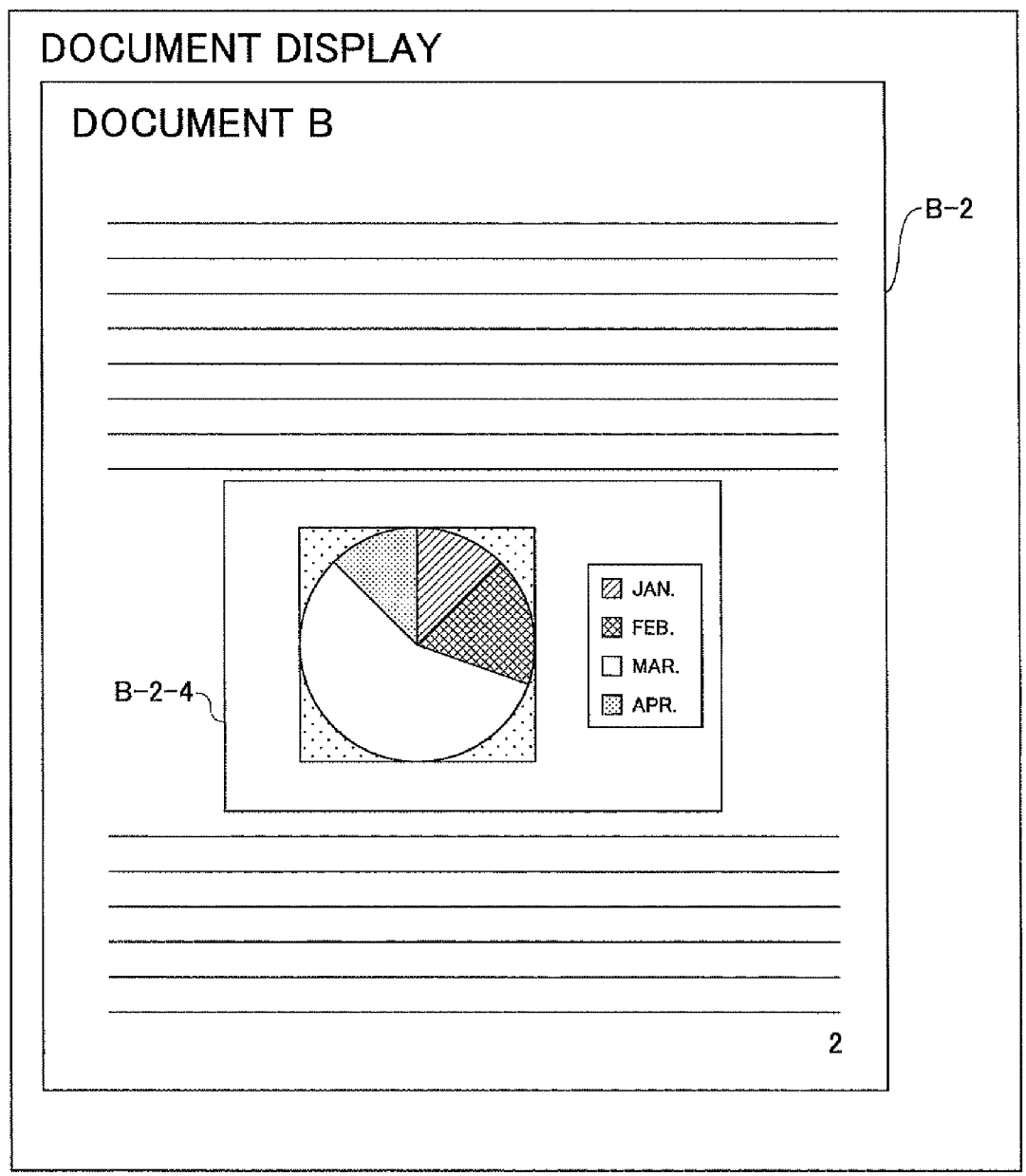
Figure 9D:
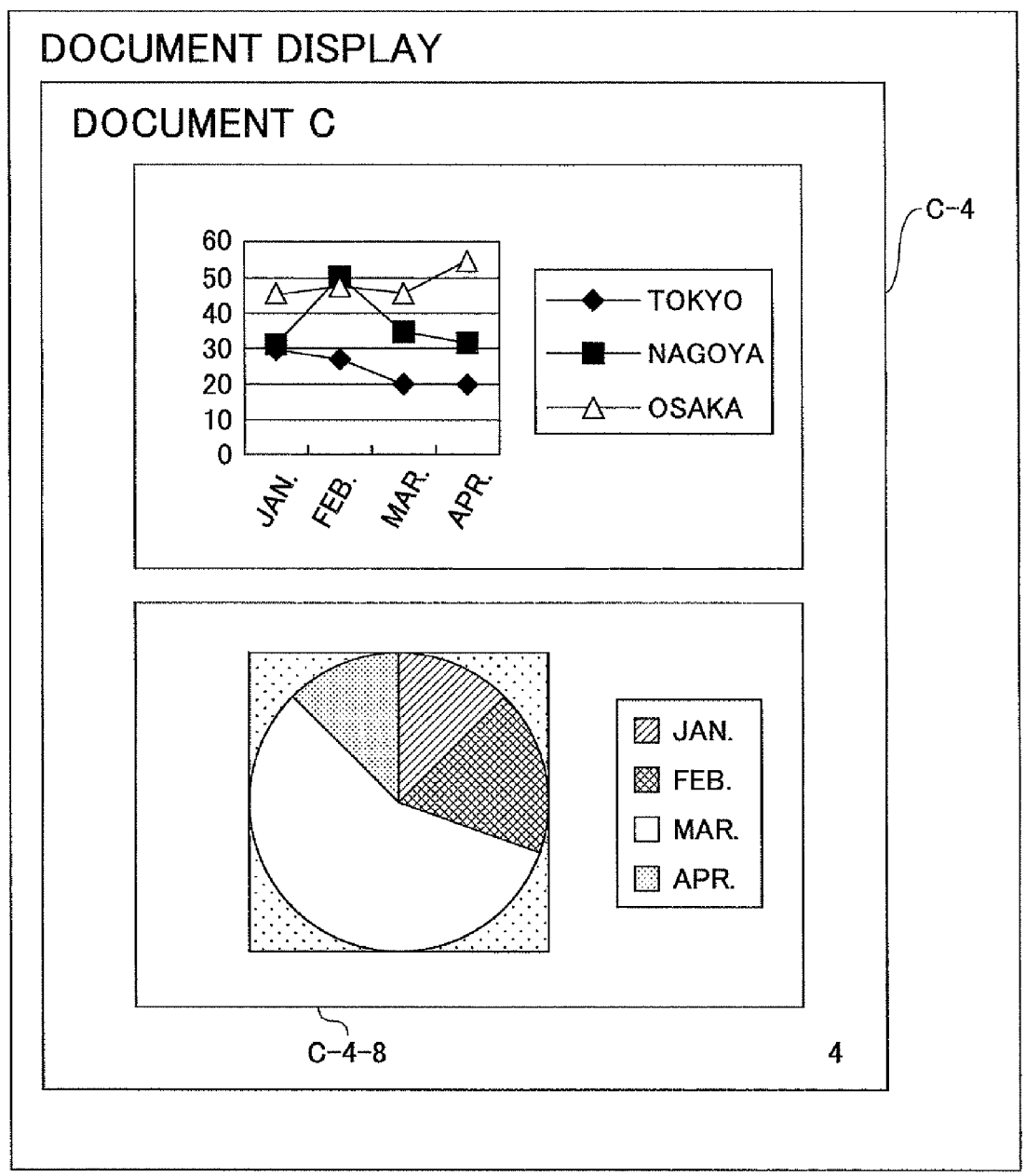

In response to this message, a user operation may be performed to select the reflecting of the change. In response, the copy partial images, i.e., the partial image B-2-4 of the document B and the partial image C-4-8 of the document C, will be updated as illustrated in FIGS. 9C and 9D, respectively. In this illustrated example, the change is not reflected in a further copy of the copy partial image (e.g., the partial image D-2-6 of the document D). Provision may be made to reflect the change in such a further copy. This is done by performing multiple-stage reflection operations

[Communication Sequence of Modifying Partial Image of Document A and Reflecting Change in Document B and Document C]

In the following, a communication sequence that is performed by use of the software illustrated in FIG. 3 to modify the partial image of the document A and to reflect the change in the document B and the document C will be described by referring to FIG. 10.

Figure 10:
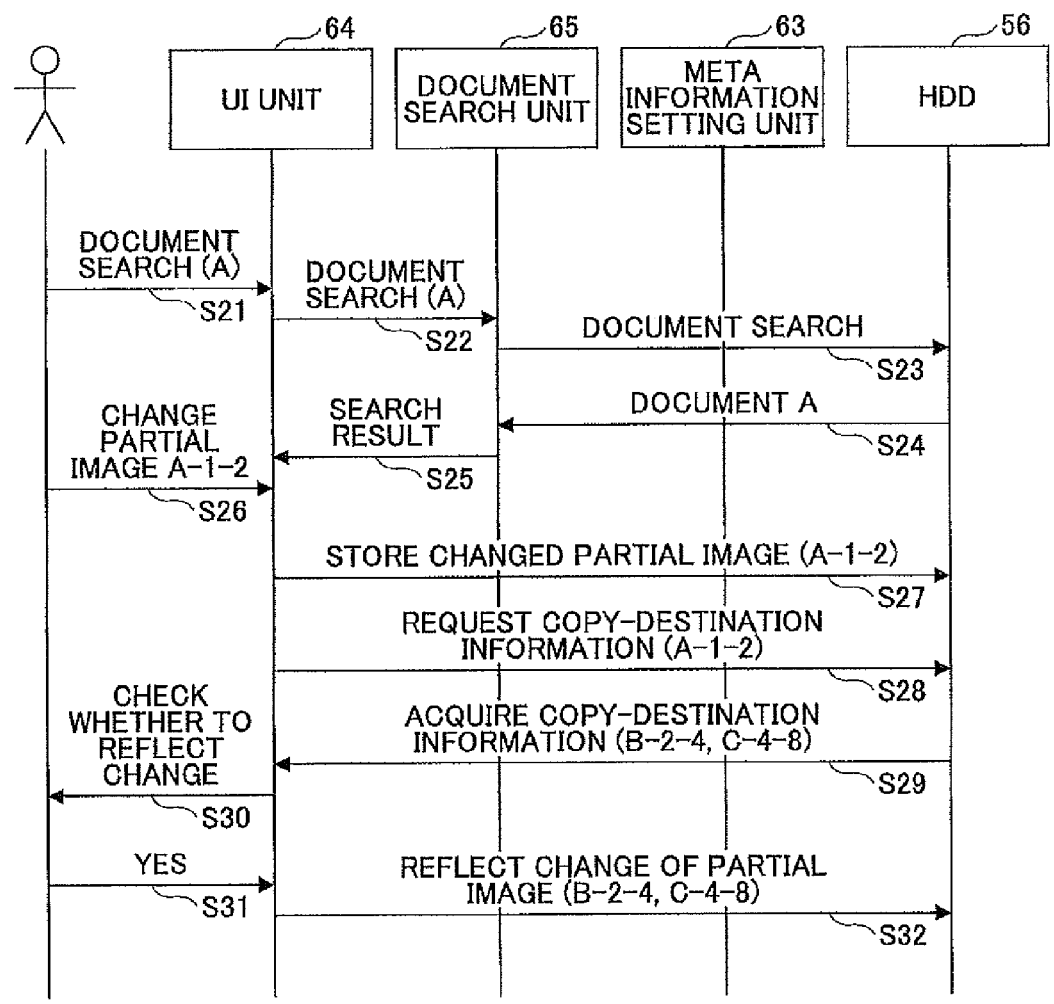
FIG. 10 is a drawing illustrating an example of a communication sequence that is performed by use of the software illustrated in FIG. 3 to modify the partial image of the document A illustrated in FIG. 5A and to reflect the change in the document B and the document C illustrated in FIGS. 5B and 5C, respectively.

FIG. 10 is a drawing illustrating an example of a communication sequence that is performed by use of the software illustrated in FIG. 3 to modify the partial image of the document A illustrated in FIG. 5A and to reflect the change in the document B and the document C illustrated in FIGS. 5B and 5C, respectively.

A user operation is performed to request a search of the document A as illustrated in FIG. 5A (S21). In response, the UI unit 64 transmits a search request to the document search unit 65 (S22).

Upon receiving the search request, the document search unit 65 searches for the document A in the HDD 56 to retrieve the document A from the HDD 56 (S23, S24). The document search unit 65 sends the retrieved document to the UI unit 64 as search results (S25).

Upon receiving the document A from the document search unit 65, the UI unit 64 displays the document A on the display unit 55 (i.e., opens a document edit screen for the document A) as illustrated in FIG. 9A.

A user operation is then performed to request to modify the partial image (original partial image) A-1-2 of the document A (S26). In response to the request, the UI unit 64 modifies the partial image A-1-2. For example, the partial image may be modified as illustrated in FIG. 9B.

Thereafter, the following processes will be performed.

The modified partial image A-1-2 is first stored in the HDD 56 (327). Then, a request to obtain information (i.e., meta information) about the copies of the partial image A-1-2 is transmitted to the HDD 56 (S28). The information about the copies, i.e., the copy-destination information indicative of the partial images B-2-4 and C-4-8, is then read (i.e., acquired) from the HDD 56 (S29).

A message requesting confirmation as to whether a change of the partial image of the document A needs to be reflected in the copies is displayed on the document edit screen of the document A as illustrated in FIG. 9B (S30). In response to the confirmation request, a user operation may be performed to select "Yes" to reflect the change (S31) As a result, the change is reflected in the partial image B-2-4 of the document B and the partial image C-4-8 of the document C.

Through the operations described above, the document display screens of the documents B and C will appear on the display unit 55 as illustrated in FIG. 9C and FIG. 9D, respectively.

Multiple-stage reflection operations may be performed to reflect the change of the partial image of the document A in the partial image D-2-6 of the document D. In such a case, acquisition of copy-destination information is performed in multiple stages, and the change of the partial image is then reflected in the partial images indicated by the returned values (i.e., copy-destination information).

[User Operation to Display Copy-Source Document on Document having Copy Partial Image]

In the following, a user operation to display a copy-source document on a document having a copy partial image will be described by referring to FIGS. 11A through 11C.

Figure 11A:
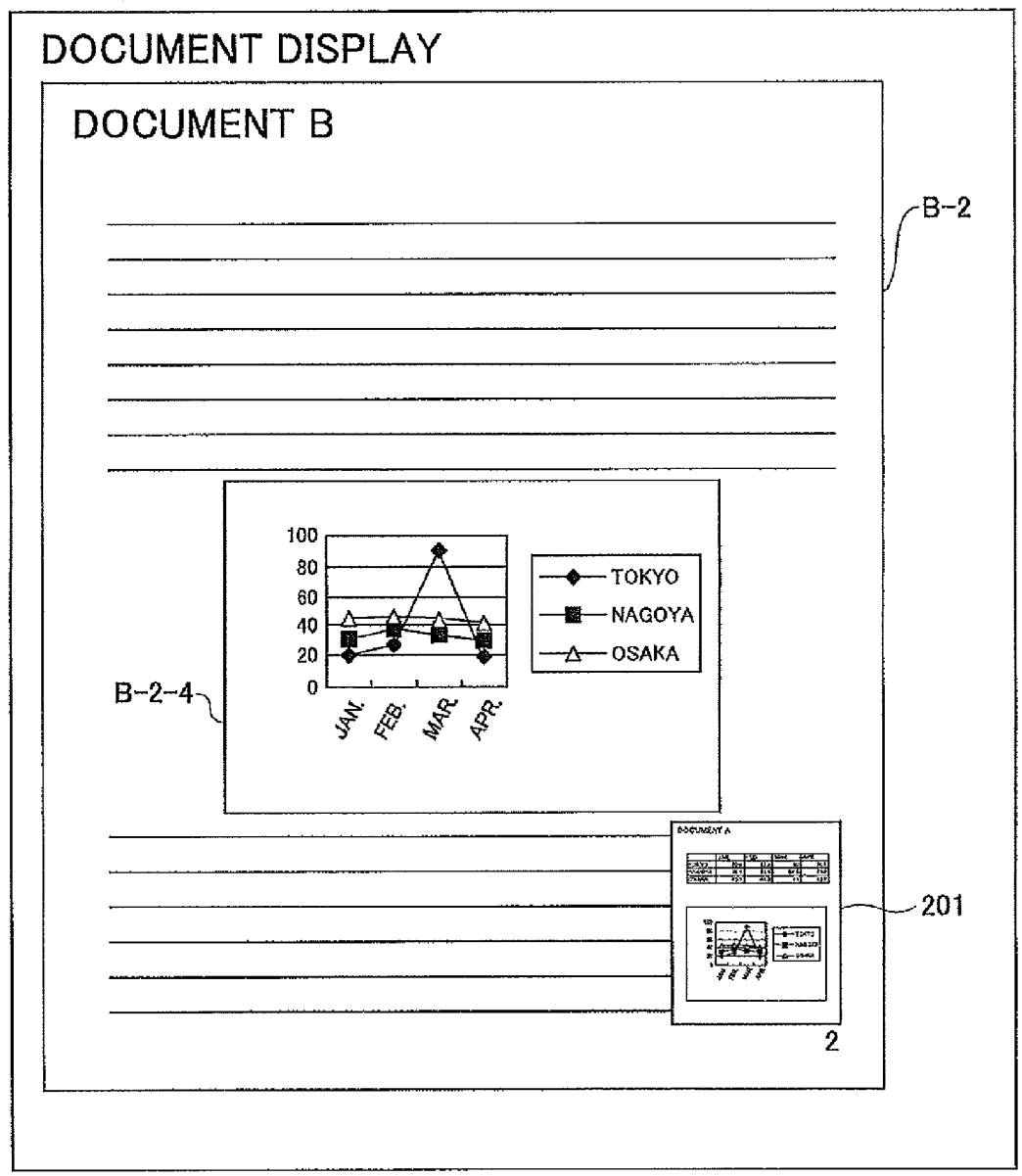
Figure 11B:
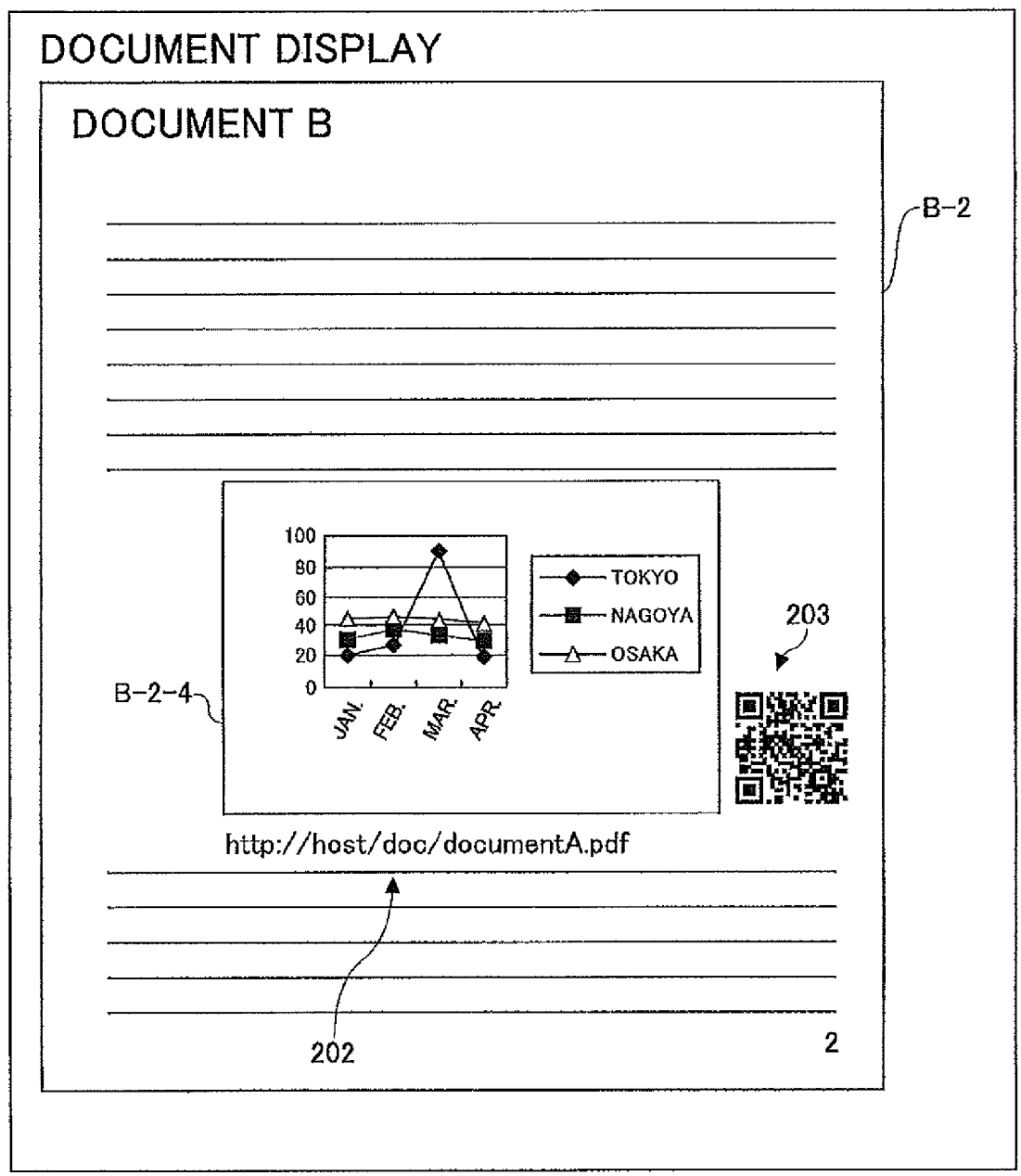

FIGS. 11A through 11C are drawings illustrating an example of a user operation to display the copy-source document A as illustrated in FIG. 5A on the document B having a copy partial image as illustrated in FIG. 5B.

A user operation may be performed to display the document B (i.e., copy-destination document) as illustrated in FIG. 5B in a document display screen on the display unit 55, for example. In such a case, the UI unit 64 may display a copy-source image 201 in the vicinity of the copy partial image B-2-4 as illustrated in FIG. 11A wherein the copy-source image 201 is a reduced image of the document A having the partial image A-1-2 that is the original of the partial image B-2-4. Alternatively, the UI unit 64 may display the meta information indicative of the copy source of the partial image B-2-4 in the vicinity of the copy partial image B-2-4 as illustrated in FIG. 11B in a form of a character string 202, a two-dimensional barcode 203, or the like.

Such information may be displayed on the last page B-25 of the document B as illustrated in FIG. 11C.

The presentation of the information makes it possible to learn the existence of a copy source and to easily know outline information such as the layout of the copy-source document.

Instead of displaying the copy-source document on the display unit 55, the printer 2 or 3 may be used to print it on a print medium.

[Process of Explicitly Indicating Copy Source of Partial Image]

In the following, a process of explicitly indicating partial images as a copy source upon displaying a copy-source document on the display unit 55 will be described by referring to FIGS. 12A and 12B.

Figure 12A:
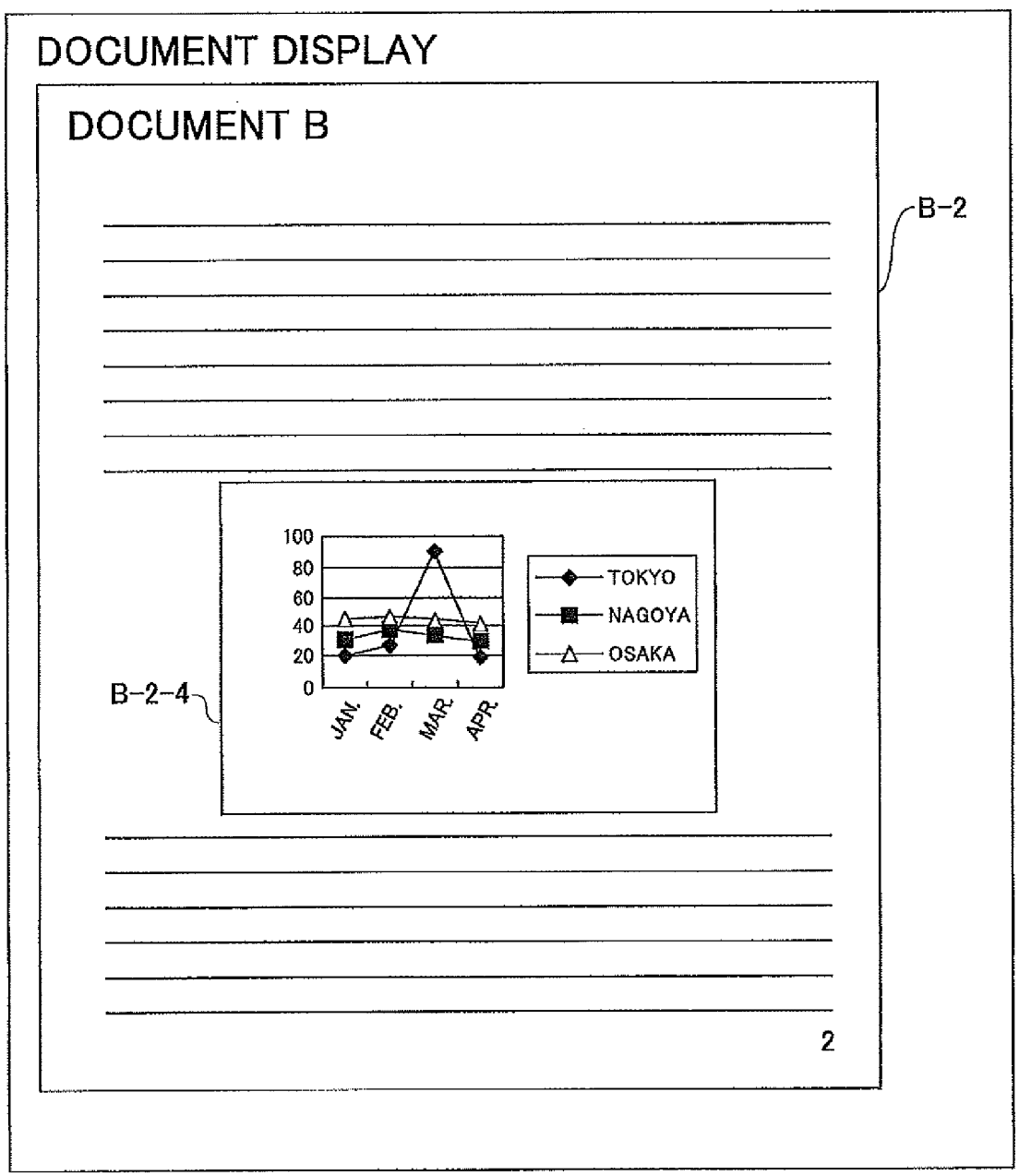
FIGS. 12A and 12B are drawings illustrating a process of explicitly indicating partial images as a copy source upon displaying a copy-source document on the display unit of FIG. 2.
Figure 12B:
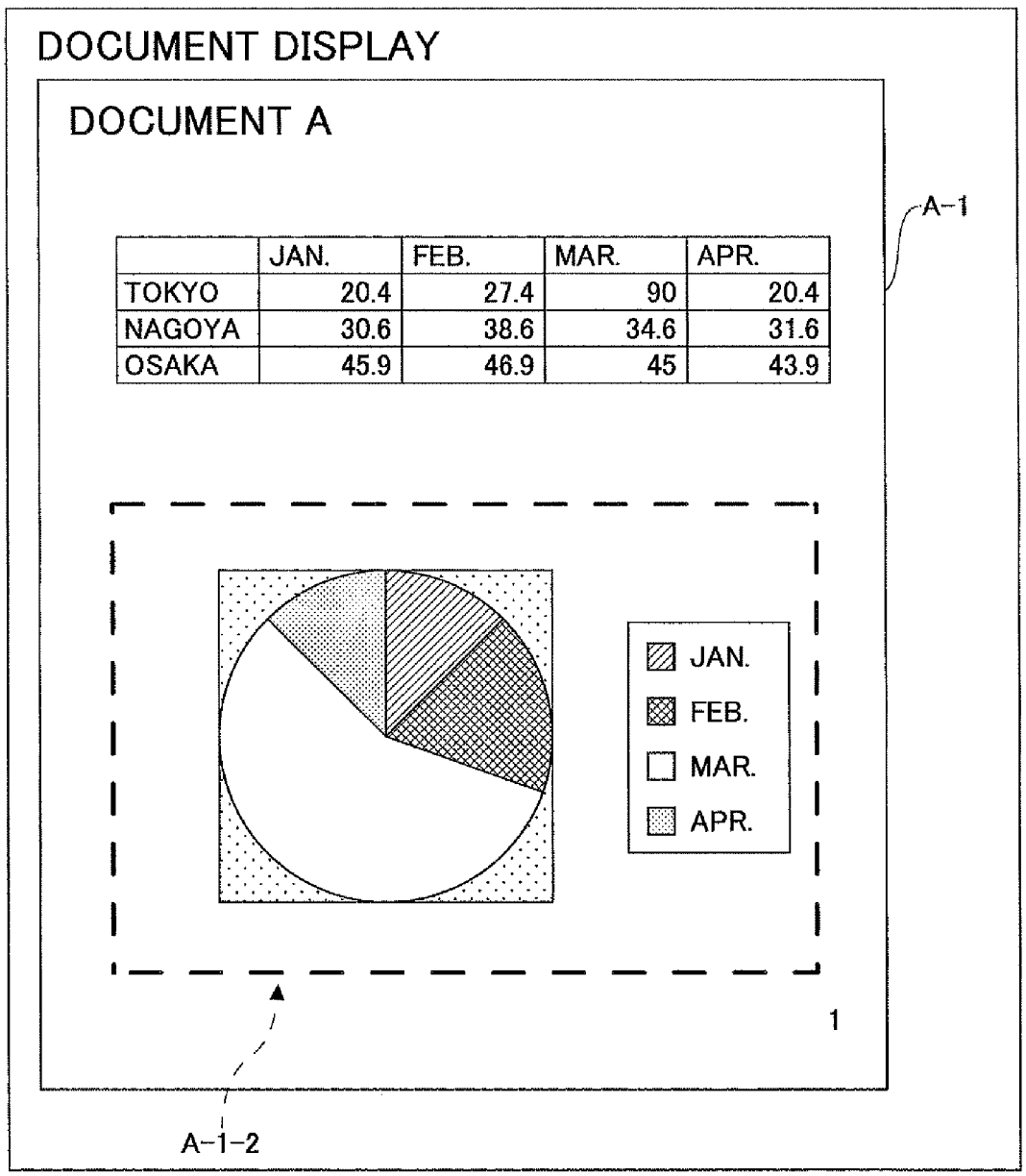

FIGS. 12A and 12B are drawings illustrating a process of explicitly indicating partial images as a copy source upon displaying a copy-source document on the display unit 55 of FIG. 2.

In response to a user operation, the UI unit 64 displays the document B (i.e., copy-destination document) having the partial image B-2-4 as illustrated in FIG. 5B in a document display screen on the display unit 55 as illustrated in FIG. 12A. The UI unit 64 then identifies the original by tracing the partial image from the copy-destination document B to display the copy-source document A.

The original partial image A-1-2 may be edited through user operations to be modified as illustrated in FIG. 12B. When this happens, it is not ascertainable which image is the original image.

In consideration of this, dotted lines enclosing the partial image A-1-2 are displayed to explicitly indicate that the modified partial image A-1-2 is the original. With this arrangement, a user can learn which image is the original.

[User Operation to Remove Original Partial Image]

In the following, a user operation to remove an original partial image will be described by referring to FIGS. 13A and 13B.

Figure 13A:
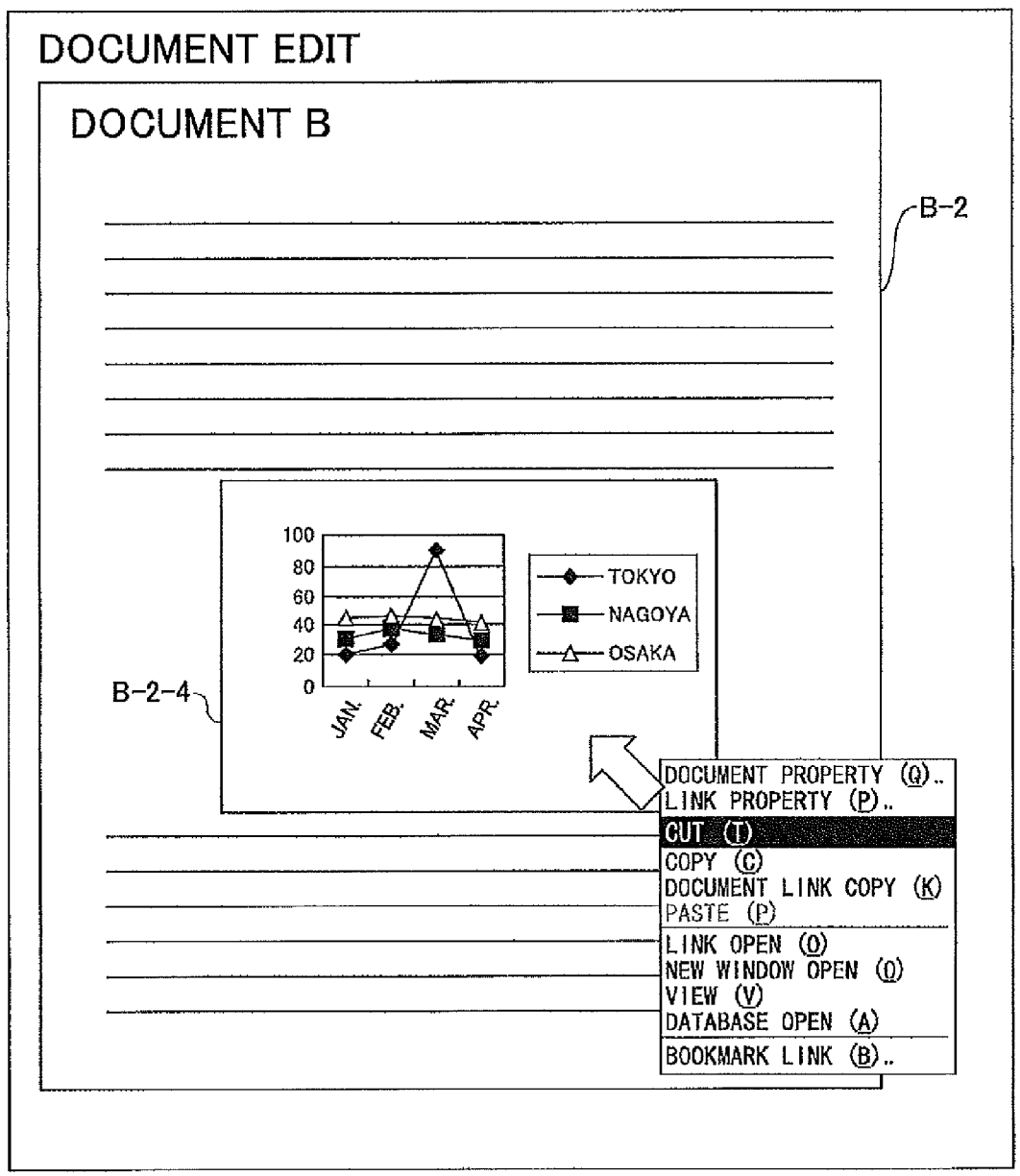
FIGS. 13A and 13B are drawings illustrating an example of a user operation to remove a partial image B-2-4 of the document B as illustrated in FIG. 5B that is the original of a partial image D-2-6 of the document D as illustrated in FIG. 5D.
Figure 13B:
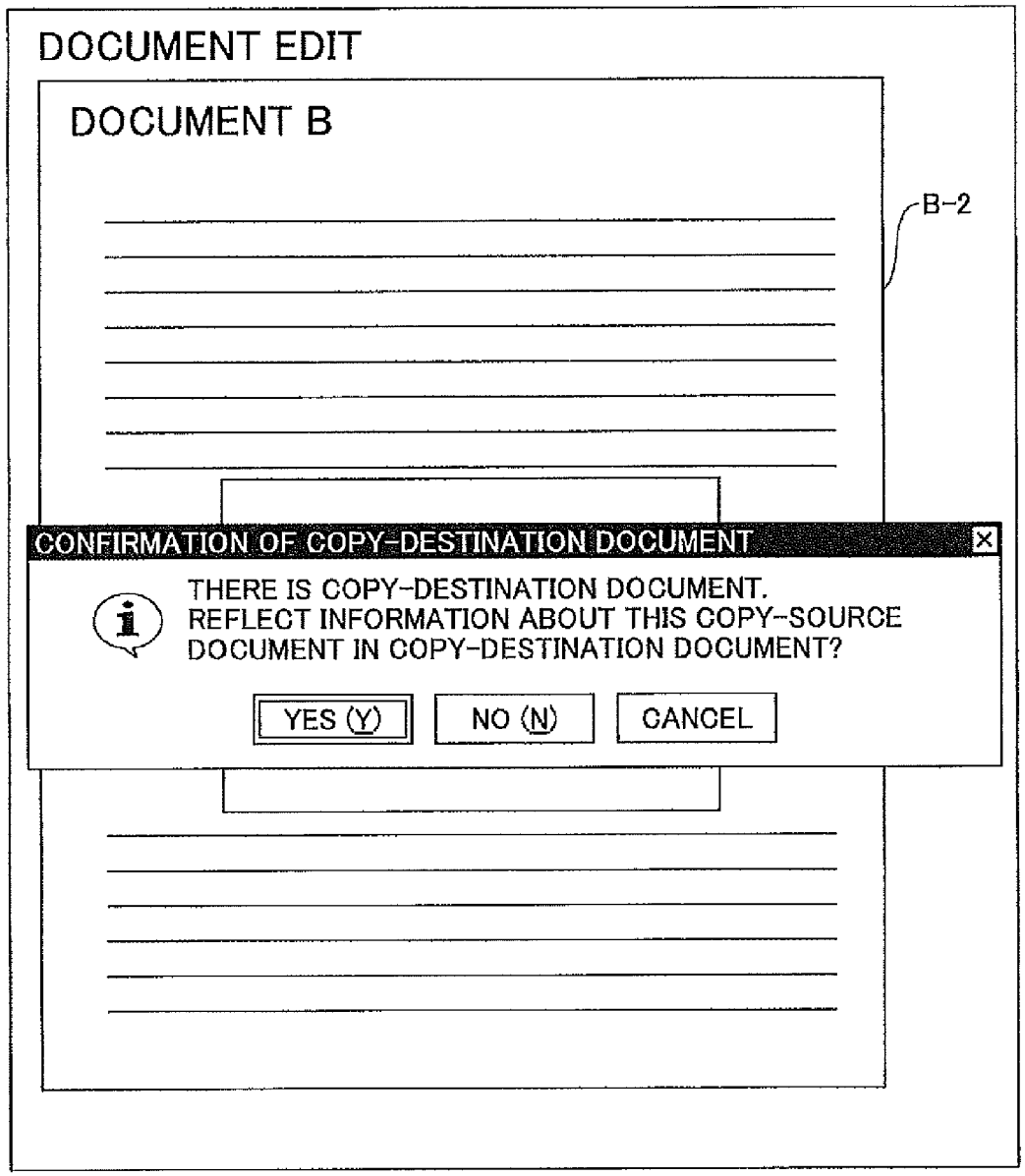

FIGS. 13A and 13B are drawings illustrating an example of a user operation to remove the partial image B-2-4 of the document B as illustrated in FIG. 5B that is the original of the partial image D-2-6 of the document D as illustrated in FIG. 5D.

A user operation may be performed to request to edit the document B. In response, as illustrated in FIG. 13A, the display unit 55 displays the document B having the partial image B-2-4 of FIG. 5B in a document edit screen.

It should be noted that the partial image B-2-4 of the document B has been copied from the partial image A-1-2 of the document A. Since the partial image B-2-4 of the document B is associated with the document D that is a copy destination, the removal of the partial image B-2-4 of the document B will result in an original being unable to be found from the image of the document D.

In order to prevent this, a user operation to remove the partial image B-2-4 of the document B will prompt a message to be displayed to request confirmation as to whether the removal needs to be reflected on the partial image D-2-6 of the document D. This message may read: "There is a copy-destination document. Reflect information about this copy-source document in the copy-destination document?"

In this example, a confirmation message is directed to a copy destination. The same procedure may be performed with respect to a copy source.

[Change in Meta Information to Identify Original and Copy of Partial Image Upon Removing Partial Image]

In the following, changes in meta information to identify an original and copy of a partial image upon deleting the partial image will be described by referring to FIGS. 14A and 14B.

FIGS. 14A and 14B are drawings illustrating examples of changes in meta information to identify an original and copy of a partial image upon deleting the partial image B-2-4 of the document B as illustrated in FIG. 5B.

The documents A, B, C, and D as illustrated in FIGS. 5A through 5D are stored in the HDD 56. In this situation, meta information about the partial image A-1-2 of the document A, the partial image B-2-4 of the document B, the partial image C-4-8 of the document C, and the partial image D-2-6 of the document D is given as illustrated in FIG. 14A.

The document B may then be removed. In response, the meta information corresponding to the partial image B-2-4 of the document B will be removed as illustrated in FIG. 14B.

In conjunction with this removal, the meta information corresponding to the partial image D-2-6 of the document D is updated such that the copy-source information indicative of the document B, the page B-2, and the partial image B-2-4 is changed to the copy-source information indicative of the document A, the page A-1, and the partial image A-1-2.

Further, the meta information corresponding to the partial image A-1-2 of the document A is updated such that the first copy-destination information indicative of the document B, the page B-2, and the partial image B-2-4 is changed to the copy-destination information indicative of the document D, the page D-2, and the partial image D-2-6.

[Communication Sequence of Removing Original Partial Image]

In the following, a communication sequence that is performed by use of the software illustrated in FIG. 3 to remove the partial image B-2-4 of the document B as illustrated in FIG. 5B will be described by referring to FIG. 15.

FIG. 15 is a drawing illustrating an example of a communication sequence that is performed by use of the software illustrated in FIG. 3 to remove the partial image B-2-4 of the document B as illustrated in FIG. 5B.

A user operation is performed to request a search of the document B as illustrated in FIG. 5B (S41). In response, the UI unit 64 transmits a search request to the document search unit 65 (S42).

Upon receiving the search request, the document search unit 65 searches for the document B in the HDD 56 to retrieve the document B from the HDD 56 (S43, S44). The document search unit 65 sends the retrieved document to the UI unit 64 as search results (S45).

Upon receiving the document B from the document search unit 65, the UI unit 64 displays the document B on the display unit 55 (i.e., opens a document edit screen for the document B) as illustrated in FIG. 13A.

A user operation is then performed to remove the partial image B-2-4 of the document B (S46). In response, the UI unit 64 deletes the partial image B-2-4 from the document edit screen of the document B, followed by performing the following processes.

The partial image B-2-4 is removed from the HDD 56 (S47). Then, a request to obtain information (i.e., meta information) about the copies of the partial image B-2-4 is transmitted to the HDD 56 (S48). The meta information about the copy, i.e., the copy-destination information indicative of the partial image D-2-6, is then read from the HDD 56 (S49). Further, a request to obtain information (i.e., meta information) about the original of the partial image B-2-4 is transmitted to the HDD 56 (S50). The meta information about the original, i.e., the copy-source information indicative of the partial image A-1-2, is then read from the HDD 56 (S51).

A message requesting confirmation as to whether the removal of the partial image of the document B needs to be reflected is displayed on the document edit screen of the document B as illustrated in FIG. 13B (S52). In response to the confirmation request, a user operation may be performed to select "Yes" to reflect the removal (S53). A request is then sent to the meta information setting unit 63 to update (modify) the copy-destination information of the meta information corresponding to the partial image A-1-2 of the document A (S54) as previously described.

Further, a request is sent to the meta information setting unit 63 to update (modify) the copy-source information of the meta information corresponding to the partial image D-2-6 of the document D (S55) as previously described.

The meta information setting unit 63 updates the meta information in accordance with the requests.

When multiple-stage reflection operations are to be performed, acquisition of copy-destination information is performed in multiple stages, and the removal of the partial image is then reflected in the partial images indicated by the returned values.

As has been described heretofore, image areas inclusive of images such as drawings, tables, and photographs and text areas inclusive of character strings are detected in a document acquired by the scanner 1 or the like, followed by performing a registration process that stores the extracted partial images in the HDD. The registration process also associates the document, the partial images, and the pages containing the partial images with each other as they are stored in the HDD. After meta information indicative of such association is set forth, an external operation is performed to search for a document in the HDD for presentation on the display unit. A partial image in this document is then copied and pasted onto another document that initially has no such partial image. In so doing, meta information for identifying a copy source of the partial image is included as copy-source meta information in the meta information of such another document stored in the HDD. With this arrangement, it is possible to easily refer to the meta information corresponding to the original partial image (i.e., to check whether there is an original), thereby improving the reusability of partial images.

Further, advantages as indicated in the following items (a) through (e) will be obtained.

(a) Meta information for identifying a copy destination is added to meta information corresponding to the original partial image, so that it is possible to easily refer to meta information corresponding to the copy partial image (i.e., to easily check whether there is a copy).

Further, when the original partial image is modified on the display unit, the meta information for identifying a copy destination is used to modify the copy partial image of the copy-destination document, thereby readily reflecting the modification of the original in the copy.

(b) When a copy-destination document is displayed on the display unit, the document having the original partial image is also displayed, thereby allowing outline information about the copy-source document to be learned.

(c) Meta information for identifying a copy source is presented on the copy-destination document being displayed on the display unit, thereby making it known that there is a reference source. Further, such information may be printed, so that one can refer to the reference source even when they are not using the system.

(d) Meta information of the copy partial image is utilized to explicitly indicate a partial image as an original when the copy-source document is displayed on the display unit, thereby making it possible to learn which image is copied from the copy-source document.

(e) Upon removing an original partial image as indicated in meta information of a given partial image, the meta information indicative of the removed partial image is replaced with meta information indicative of a partial image that is a further original of the removed original. This can lower the possibility of finding no reference when a copy-source or copy-destination document, page, or image is removed.

[Program of Invention]

A program of the present invention serves to cause a CPU (computer) of an information processing apparatus such as a host computer to perform the functions of the partial image extracting unit, the document registering unit, the meta information setting unit, the document search unit, the process performing unit, and the meta information updating unit. Such a program is executed by a CPU to achieve the advantages that have been described heretofore.

This program may be provided as being pre-stored in a memory means such as a ROM, a nonvolatile memory (e.g., Flash ROM, EEPROM), or an HDD (hard-disk drive) embedded in the information processing apparatus, or may be provided through a nonvolatile recording medium (memory) such as a CD-ROM, memory card, flexible disc, MO, CD-R, CD-RW, DVD+R, DVD+RW, DVD-R, DVD-RW, or DVD-RAM. The program recorded in such a memory medium is installed in the information processing apparatus for execution by the CPU, or the CPU is instructed to read the program from the memory medium for execution, thereby achieving each procedure as described above.

It is also possible to execute the program by downloading the program from an external apparatus having a recording medium with the program recorded therein or from an external apparatus having the program recorded in the memory means thereof.

As is apparent from the above description, the disclosed arrangement makes it possible to easily refer to the meta information corresponding to the original partial image (i.e., to check whether there is an original), thereby improving the reusability of partial images. The disclosed arrangement can thus provide an information processing apparatus (e.g., a computer such as a personal host computer or a workstation) that can perform more useful information processing.

Further, the present invention is not limited to these embodiments, but various variations and modifications may be made without departing from the scope of the present invention.

The present application is based on Japanese priority application No. 2008-068173 filed on Mar. 17, 2008, with the Japanese Patent Office, the entire contents of which are hereby incorporated by reference.

What is claimed is:

1. An information processing apparatus for storing and retrieving a document having images and texts in and from a document storage unit, comprising:

a partial image extracting unit configured to extract partial images from input documents;

a document registering unit configured to store the input documents and the partial images extracted by the partial image extracting unit in the document storage unit;

a meta information setting unit configured to associate a given one of the input documents with the partial images of the given one of the input documents to generate meta information indicative of the association regarding the given one of the input documents;

a search unit configured to search for and retrieve one of the input documents as a first document from the document storage unit to display the first document on a display unit; and a user interface unit configured to perform an operation with respect to a partial image of the first document displayed on the display unit in response to an external instruction, wherein the meta information setting unit is configured to add copy-source information indicative of the partial image of the first document to the meta information regarding a second document of the input documents when the user interface unit copies the partial image of the first document and pastes the copied partial image onto the second document.

2. The information processing apparatus as claimed in claim 1, wherein the meta information setting unit is configured to further associate pages containing the partial images of the given one of the input documents with the given one of the input documents and the partial images of the given one of the input documents, thereby generating the meta information indicative of the association regarding the given one of the input documents.

3. The information processing apparatus as claimed in claim 1, wherein the meta information setting unit is configured to add copy-destination information indicative of the pasted partial image of the second document to the meta information regarding the first document.

4. The information processing apparatus as claimed in claim 3, wherein the user interface unit is configured to change the pasted partial image of the second document in response to a change made to the partial image of the first document by identifying the pasted partial image of the second document based on the meta information regarding the first document.

5. The information processing apparatus as claimed in claim 1, wherein the user interface unit is configured to display a third one of the input documents concurrently with a fourth one of the input documents on the display unit when the fourth one of the input documents is displayed on the display unit, the fourth one of the input documents containing a partial image that is copied from the third one of the input documents.

6. The information processing apparatus as claimed in claim 1, wherein the user interface unit is configured to display meta information for identifying a copy source concurrently with one of the input documents displayed on the display unit and having a partial image thereof copied from the copy source.

7. The information processing apparatus as claimed in claim 1, wherein the user interface unit is configured to display the first document on the display unit together with an indication that the partial image of the first document is an original from which a copy is made, the indication being derived from the meta information regarding the second document that includes the copy-source information indicative of the partial image of the first document.

8. The information processing apparatus as claimed in claim 1, wherein when the user interface unit deletes a partial image of a third one of the input documents that is copied from a partial image of a fourth one of the input documents and that is copied and pasted onto a fifth one of the input documents, the meta information setting unit replaces copy-source information indicative of the partial image of the third one of the input documents in meta information regarding the fifth one of the input documents with copy-source information indicative of the partial image of the fourth one of the input documents.

9. The information processing apparatus as claimed in claim 1, wherein the input documents are obtained from paper documents on which images and texts are printed, and the input documents are electronic data acquired by optically scanning the paper documents.

10. The information processing apparatus as claimed in claim 1, wherein the partial image extracting unit is configured to perform a character recognition process with respect to texts extracted from the input documents.

11. The information processing apparatus as claimed in claim 1, further comprising a document input unit configured to obtain the input documents as electronic data.

12. The information processing apparatus as claimed in claim 1, further comprising a communication unit configured to communicate with an external apparatus that provides the input documents as electronic data.

13. An information processing method for storing and retrieving a document having images and texts in and from a document storage unit, comprising:
   a partial image extracting step of extracting partial images from input documents;
   a document registering step of storing the input documents and the partial images extracted by the partial image extracting step in the document storage unit;
   a meta information setting step of associating a given one of the input documents with the partial images of the given one of the input documents to generate meta information indicative of the association regarding the given one of the input documents;
   a search step of searching for and retrieving one of the input documents as a first document from the document storage unit to display the first document on a display unit; and
   a user interface step of performing an operation with respect to a partial image of the first document displayed on the display unit in response to an external instruction,
   a meta information updating step of adding copy-source information indicative of the partial image of the first document to the meta information regarding a second document of the input documents when the user interface step copies the partial image of the first document and pastes the copied partial image onto the second document.

14. The information processing method as claimed in claim 13, wherein the meta information setting step further associates pages containing the partial images of the given one of the input documents with the given one of the input documents and the partial images of the given one of the input documents, thereby generating the meta information indicative of the association regarding the given one of the input documents.

15. A computer-readable recording medium having a program embodied therein for causing a computer to control an information processing apparatus for storing and retrieving a document having images and texts in and from a document storage unit, said program comprising:
   a partial image extracting function code configured to extract partial images from input documents;
   a document registering function code configured to store the input documents and the partial images extracted by the partial image extracting function code in the document storage unit;
   a meta information setting function code configured to associate a given one of the input documents with the partial images of the given one of the input documents to generate meta information indicative of the association regarding the given one of the input documents;
   a search function code configured to search for and retrieve one of the input documents as a first document from the document storage unit to display the first document on a display unit; and
   a user interface function code configured to perform an operation with respect to a partial image of the first document displayed on the display unit in response to an external instruction,
   wherein the meta information setting function code is further configured to add copy-source information indicative of the partial image of the first document to the meta information regarding a second document of the input documents when the user interface function code copies the partial image of the first document and pastes the copied partial image onto the second document.

16. The computer-readable recording medium as claimed in claim 15, wherein the meta information setting function code is configured to further associate pages containing the partial images of the given one of the input documents with the given one of the input documents and the partial images of the given one of the input documents, thereby generating the meta information indicative of the association regarding the given one of the input documents.

17. The computer-readable recording medium as claimed in claim 15, wherein the meta information setting function code is configured to add copy-destination information indicative of the pasted partial image of the second document to the meta information regarding the first document.

18. The computer-readable recording medium as claimed in claim 17, wherein the user interface function code is configured to change the pasted partial image of the second document in response to a change made to the partial image of the first document by identifying the pasted partial image of the second document based on the meta information regarding the first document.

19. The computer-readable recording medium as claimed in claim 15, wherein the user interface function code is configured to display a third one of the input documents concurrently with a fourth one of the input documents on the display function code when the fourth one of the input documents is displayed on the display function code, the fourth one of the input documents containing a partial image that is copied from the third one of the input documents.

20. The computer-readable recording medium as claimed in claim 15, wherein the user interface function code is configured to display meta information for identifying a copy source concurrently with one of the input documents displayed on the display function code and having a partial image thereof copied from the copy source.

* * * * *